US011831971B2

(12) United States Patent
Tokito

(10) Patent No.: US 11,831,971 B2
(45) Date of Patent: Nov. 28, 2023

(54) ONBOARD CAMERA

(71) Applicant: Sony Semiconductor Solutions Corporation, Kanagawa (JP)

(72) Inventor: Toshihiro Tokito, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 17/262,158

(22) PCT Filed: Jul. 17, 2019

(86) PCT No.: PCT/JP2019/028011
§ 371 (c)(1),
(2) Date: Jan. 21, 2021

(87) PCT Pub. No.: WO2020/026800
PCT Pub. Date: Feb. 6, 2020

(65) Prior Publication Data
US 2021/0297564 A1 Sep. 23, 2021

(30) Foreign Application Priority Data
Jul. 31, 2018 (JP) ................................ 2018-143617

(51) Int. Cl.
*H04N 23/57* (2023.01)
*G03B 17/56* (2021.01)
*H04N 23/51* (2023.01)

(52) U.S. Cl.
CPC .......... *H04N 23/57* (2023.01); *G03B 17/561* (2013.01); *H04N 23/51* (2023.01)

(58) Field of Classification Search
CPC ... H04N 5/2257; H04N 5/2252; G03B 17/561
(Continued)

(56) References Cited

U.S. PATENT DOCUMENTS 10,471,906 B2 * 11/2019 Kasai .................... H04N 23/51
10,800,343 B2 * 10/2020 Kasai .................... B60R 11/02
(Continued)

FOREIGN PATENT DOCUMENTS

CN 1822642 A 8/2006
CN 106168729 A 11/2016
(Continued)

OTHER PUBLICATIONS

International Search Report and English translation thereof dated Sep. 3, 2019 in connection with International Application No. PCT/JP2019/028012.
(Continued)

*Primary Examiner* — Matthew David Kim
(74) *Attorney, Agent, or Firm* — Wolf, Greenfield & Sacks, P.C.

(57) ABSTRACT

The present technology relates to an onboard camera that enables a camera chassis to be easily assembled while providing shielding between plates.
The onboard camera according to an aspect of the present technology has an internal structure including: a bottom face plate which forms a bottom face of a housing and has end portions serving as wall faces formed respectively at opposite ends of the bottom face plate; a board on which an electronic component is installed; a top face plate which covers the board and has end portions serving as wall faces formed respectively at opposite ends of the top face plate; and a shield plate which has insertion portions formed at opposite ends, the insertion portions being positioned in clearances between the end portions of the bottom face plate and the end portions of the top face plate to close the clearances. The present technology can be applied to an onboard camera.

9 Claims, 22 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 10,921,166 | B2 * | 2/2021 | Matori | G03B 17/561 |
| 2001/0022230 | A1 | 9/2001 | Kaplo | |
| 2006/0181633 | A1 | 8/2006 | Seo | |
| 2008/0014797 | A1 * | 1/2008 | Yang | H01R 13/6582 439/607.01 |
| 2008/0254652 | A1 * | 10/2008 | Ma | H01R 13/6583 439/67 |
| 2010/0097519 | A1 * | 4/2010 | Byrne | B60R 1/00 348/373 |
| 2010/0327138 | A1 * | 12/2010 | Yamada | B60N 2/072 248/429 |
| 2011/0025850 | A1 * | 2/2011 | Maekawa | H05K 9/002 348/148 |
| 2015/0327377 | A1 | 11/2015 | Mano et al. | |
| 2015/0327398 | A1 * | 11/2015 | Achenbach | H05K 7/2039 348/148 |
| 2016/0191863 | A1 | 6/2016 | Minikey, Jr. et al. | |
| 2016/0257265 | A1 | 9/2016 | Kageyama et al. | |
| 2016/0344912 | A1 * | 11/2016 | Baik | H04N 5/2254 |
| 2017/0217382 | A1 | 8/2017 | Gunes | |
| 2017/0240120 | A1 | 8/2017 | Krug et al. | |
| 2017/0274837 | A1 | 9/2017 | Kasai et al. | |
| 2018/0239223 | A1 | 8/2018 | Blake, III et al. | |
| 2019/0028620 | A1 * | 1/2019 | Park | H04N 5/2252 |
| 2019/0174623 | A1 * | 6/2019 | Owaki | H04N 23/51 |
| 2019/0193649 | A1 * | 6/2019 | Kataishi | H04N 23/00 |
| 2021/0127532 | A1 * | 4/2021 | Persson | H04N 5/2257 |
| 2021/0284082 | A1 | 9/2021 | Tokito | |

FOREIGN PATENT DOCUMENTS

| | | | | |
|---|---|---|---|---|
| CN | 108028459 | A | 5/2018 | |
| DE | 10 2013 005 801 | A1 | 10/2014 | |
| EP | 3512316 | A1 | 7/2019 | |
| EP | 3518033 | A1 | 7/2019 | |
| JP | H08-097584 | A | 4/1996 | |
| JP | 2006229922 | A | 8/2006 | |
| JP | 2013-004551 | A | 1/2013 | |
| JP | 2014011565 | A | 1/2014 | |
| JP | 2015-216444 | A | 12/2015 | |
| JP | 2016-159875 | A | 9/2016 | |
| JP | 2017-523088 | A | 8/2017 | |
| JP | 2017-171168 | A | 9/2017 | |
| JP | 2018-006861 | A | 1/2018 | |
| JP | 2018006861 | A * | 1/2018 | B60R 1/04 |
| JP | 2018-022953 | A | 2/2018 | |
| JP | 2018509021 | A | 3/2018 | |
| KR | 20080088718 | A | 10/2008 | |
| WO | WO 2016/010970 | A1 | 1/2016 | |
| WO | WO 2016/109790 | A1 | 7/2016 | |
| WO | WO 2017/132088 | A1 | 8/2017 | |
| WO | WO 2018/047491 | A1 | 3/2018 | |
| WO | WO 2018/055905 | A1 | 3/2018 | |
| WO | WO-2018100646 | A | 6/2018 | |

OTHER PUBLICATIONS

International Written Opinion and English translation thereof dated Oct. 8, 2019 in connection with International Application No. PCT/JP2019/028011.

International Preliminary Report on Patentability and English translation thereof dated Feb. 11, 2021 in connection with International Application No. PCT/JP2019/028011.

International Written Opinion and English translation thereof dated Sep. 3, 2019 in connection with International Application No. PCT/JP2019/028012.

International Preliminary Report on Patentability and English translation thereof dated Feb. 11, 2021 in connection with International Application No. PCT/JP2019/028012.

International Search Report and English translation thereof dated Oct. 8, 2019 in connection with International Application No. PCT/JP2019/028011.

* cited by examiner

ONBOARD CAMERA

CROSS-REFERENCE TO RELATED APPLICATIONS

This application claims the benefit under 35 U.S.C. § 371 as a U.S. National Stage Entry of International Application No. PCT/JP2019/028011, filed in the Japanese Patent Office as a Receiving Office on Jul. 17, 2019, which claims priority to Japanese Patent Application Number JP2018-143617, filed in the Japanese Patent Office on Jul. 31, 2018, each of which is hereby incorporated by reference in its entirety.

TECHNICAL FIELD

The present technology relates to an onboard camera and particularly to an onboard camera that enables a camera chassis to be easily assembled while providing shielding between plates.

BACKGROUND ART

In recent years, there are more and more automobiles in which a camera is mounted. For example, images captured by the camera are used to detect objects such as white lines on roads, traffic lights, road signs, oncoming cars, and pedestrians and to provide traveling assistance and visibility assistance on the basis of detection results.

From viewpoints of heat resistance, impact resistance, and the like, a chassis of the onboard camera has a box structure formed by combining a plurality of metal plates. In order to establish conduction between the metal plates and to secure electromagnetic wave shielding performance, "a shield finger" or "a gasket" is used as a shield member between the metal plates in some cases.

CITATION LIST

Patent Document

Patent Document 1: Japanese Patent Application Laid-Open No. 2018-022953

SUMMARY OF THE INVENTION

Problem to be Solved by the Invention

In a case where the above-described "shield finger" or "gasket" is used between the metal plates, the number of parts increases naturally.

Furthermore, such shield members are mounted by use of adhesive tape and it is impossible to secure conductivity as expected depending on a quality of material of the adhesive tape.

Furthermore, in a case where the adhesive tape is used for mounting of the shield member, the shield member may be positionally displaced or detached during assembly or after the assembly in some cases.

The present technology has been made with such circumstances in view and enables a camera chassis to be easily assembled while providing shielding between plates.

Solutions to Problem

An onboard camera according to an aspect of the present technology has an internal structure including: a bottom face plate which forms a bottom face of a housing and has end portions serving as wall faces formed respectively at opposite ends of the bottom face plate; a board on which an electronic component is installed; a top face plate which covers the board and has end portions serving as wall faces formed respectively at opposite ends of the top face plate; and a shield plate which has insertion portions formed at opposite ends, the insertion portions being positioned in clearances between the end portions of the bottom face plate and the end portions of the top face plate to close the clearances.

According to the aspect of the present technology, the insertion portions of the shield plate are positioned in the clearances between the end portions of the bottom face plate and the end portions of the top face plate to thereby close the clearances.

Effects of the Invention

With the present technology, it is possible to easily assemble a camera chassis while providing shielding between the plates.

Note that the effect described herein is not necessarily a sole effect and any of effects described herein may be exerted.

BRIEF DESCRIPTION OF DRAWINGS

FIG. 18 is a view of a state where the shield plate is put on.

MODE FOR CARRYING OUT THE INVENTION

Figure 1:
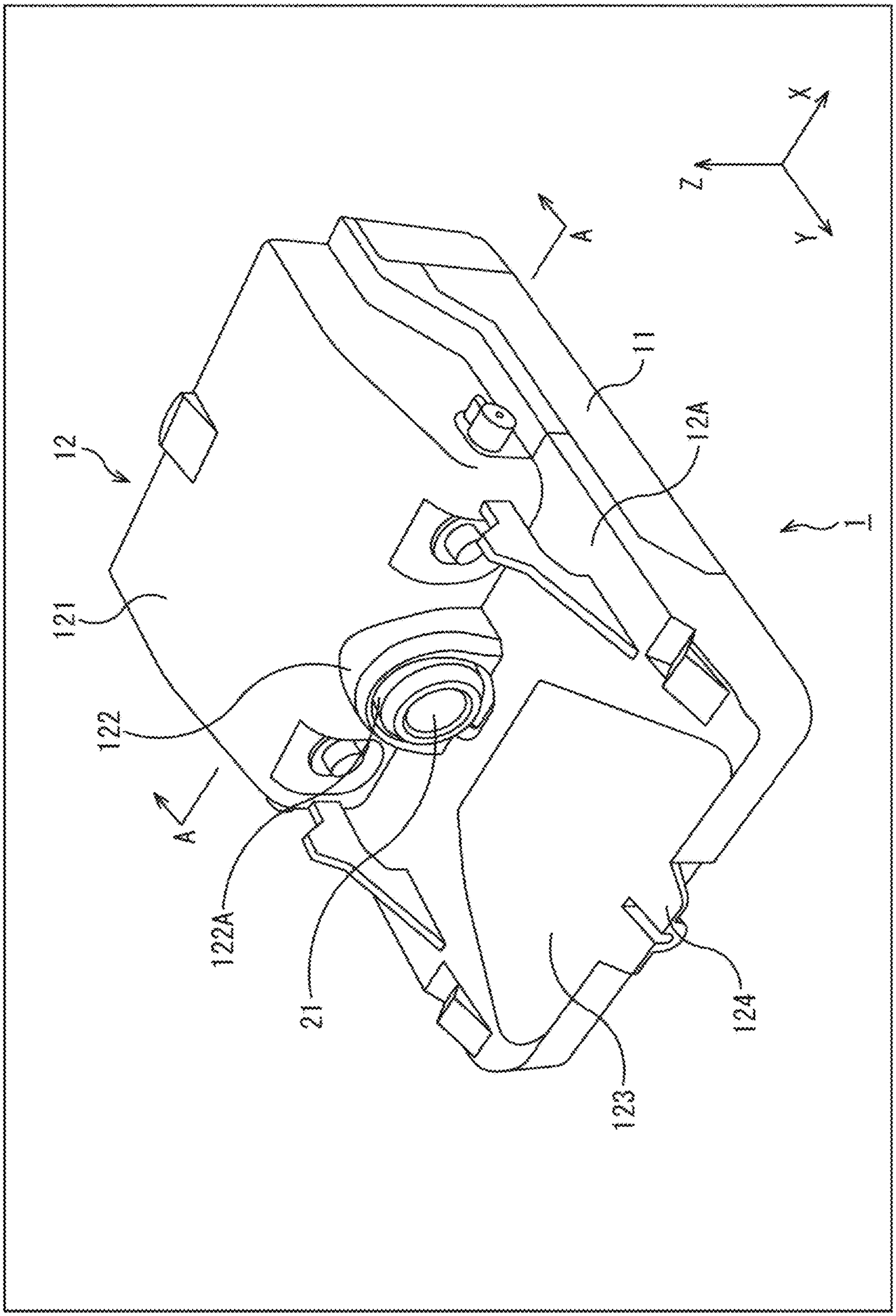
FIG. 1 is a perspective view of an exemplary outward appearance of a front camera according to an embodiment of the present technology.

A mode for carrying out the present technology will be described below. The description will be given in the following order.

1. Outward appearance of front camera
2. Configurations of respective faces of front camera
3. Internal structure of front camera
4. Configurations of respective plates
5. Internal configuration
6. Modifications <Outward Appearance of Front Camera>

FIG. 1 is a perspective view of an exemplary outward appearance of a front camera according to an embodiment of the present technology.

The front camera 1 has a housing having a substantially flattened wedge shape sloping down forward in a side view. In FIG. 1, a normal direction along a Y-axis corresponds to a forward direction with respect to the front camera 1.

The front camera 1 is formed by covering a bottom plate 11, forming a bottom face, and the like with a front case 12. For example, the bottom plate 11 is formed by processing a thin plate member including metal such as aluminum and the front case 12 includes resin having high heat resistance.

In a rear of a top face portion 12A of the front case 12, a housing portion 121 is formed to bulge while leaving narrow marginal portions on left and right sides (in an X-axis direction). Respective parts are housed in a space inside the housing portion 121. A forward portion of a top face of the housing portion 121 forms a slope gently sloping down forward.

A semicylindrical arch portion 122 protruding forward is formed at a substantially central position of a front face side of the housing portion 121, and a substantially circular hole portion 122A is formed on a front face side of the arch portion 122. A lens module is provided in the housing portion 121 such that a lens 21 of the lens module is exposed from the hole portion 122A.

A trapezoidal recessed portion 123 widening in the X-axis direction as it extends forward (in the normal direction along the Y-axis) and recessed shallowly to have a slope gently sloping down forward is formed on a forward side of the lens 21 provided to face the front. The recessed portion 123 is formed so as not to obstruct an angle of view of the front camera 1.

At a center of a tip end of the front camera 1, a tip end protruding portion 124 forming a face continuous with the slope of the recessed portion 123 is formed. The tip end protruding portion 124 is a small chip member having a substantially trapezoidal shape with round corners in a plan view. Details of a shape of the front camera 1 will be described later.

The front camera 1 having such a configuration in outward appearance is an onboard camera mounted to a vehicle such as an automobile.

Figure 2:
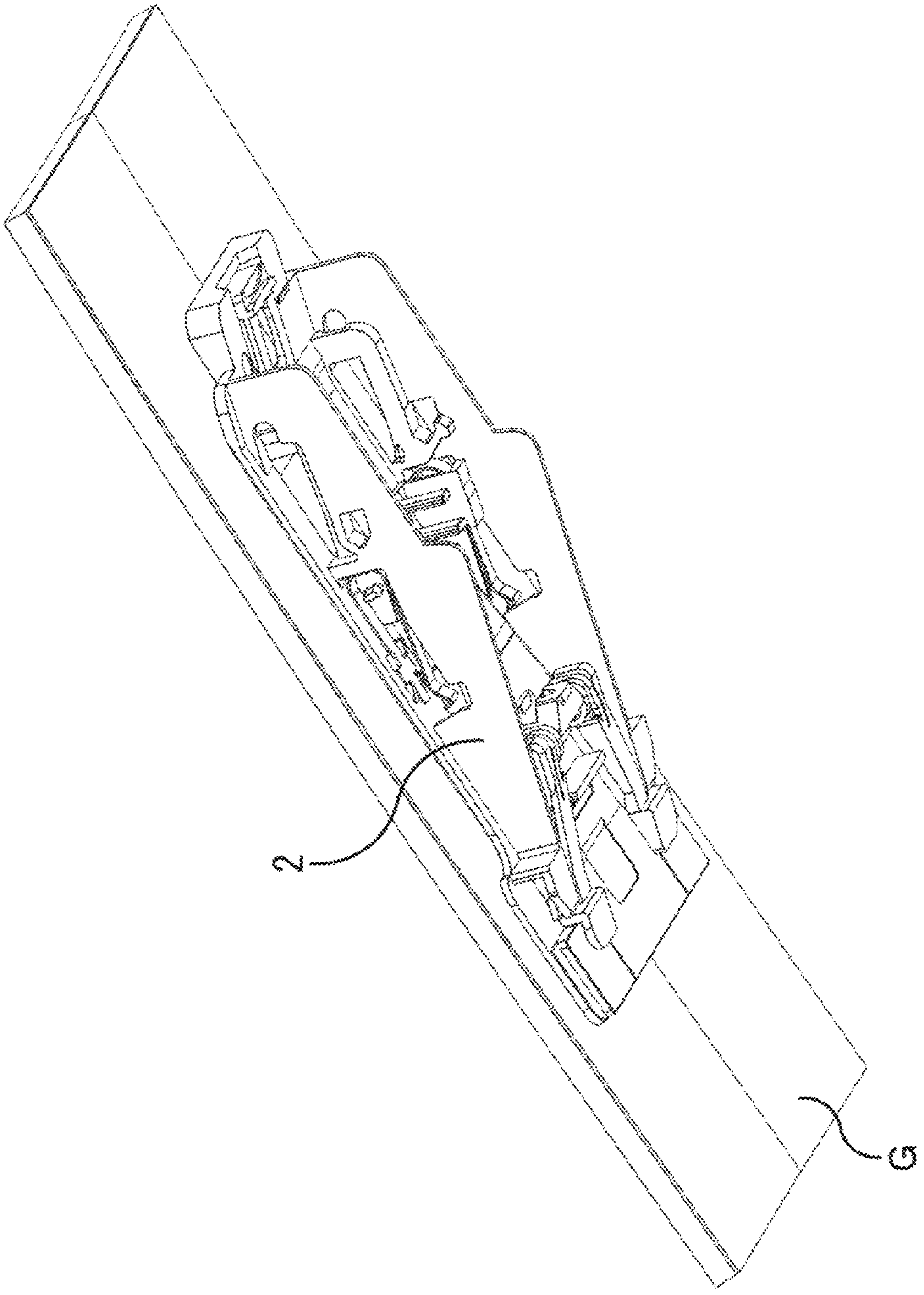
FIG. 2 is a view showing an example of a way to mount the front camera.

FIG. 2 is a view showing an example of a way to mount the front camera 1. Reference sign G designates a windshield of the car.

As shown in FIG. 2, a bracket 2 serving as a receiving-side mounting part to which the front camera 1 is mounted is mounted to an inner side (a side of a vehicle interior) of the windshield G. The bracket 2 is mounted, for example, near a rearview mirror.

In FIG. 2, a left side of the windshield G is an outer side of the vehicle and a right side is an inner side of the vehicle. Although only a band-shaped portion having a predetermined width is shown as a portion of the windshield in the example in FIG. 2, the whole windshield G is actually formed by a broader glass member.

Figure 3:
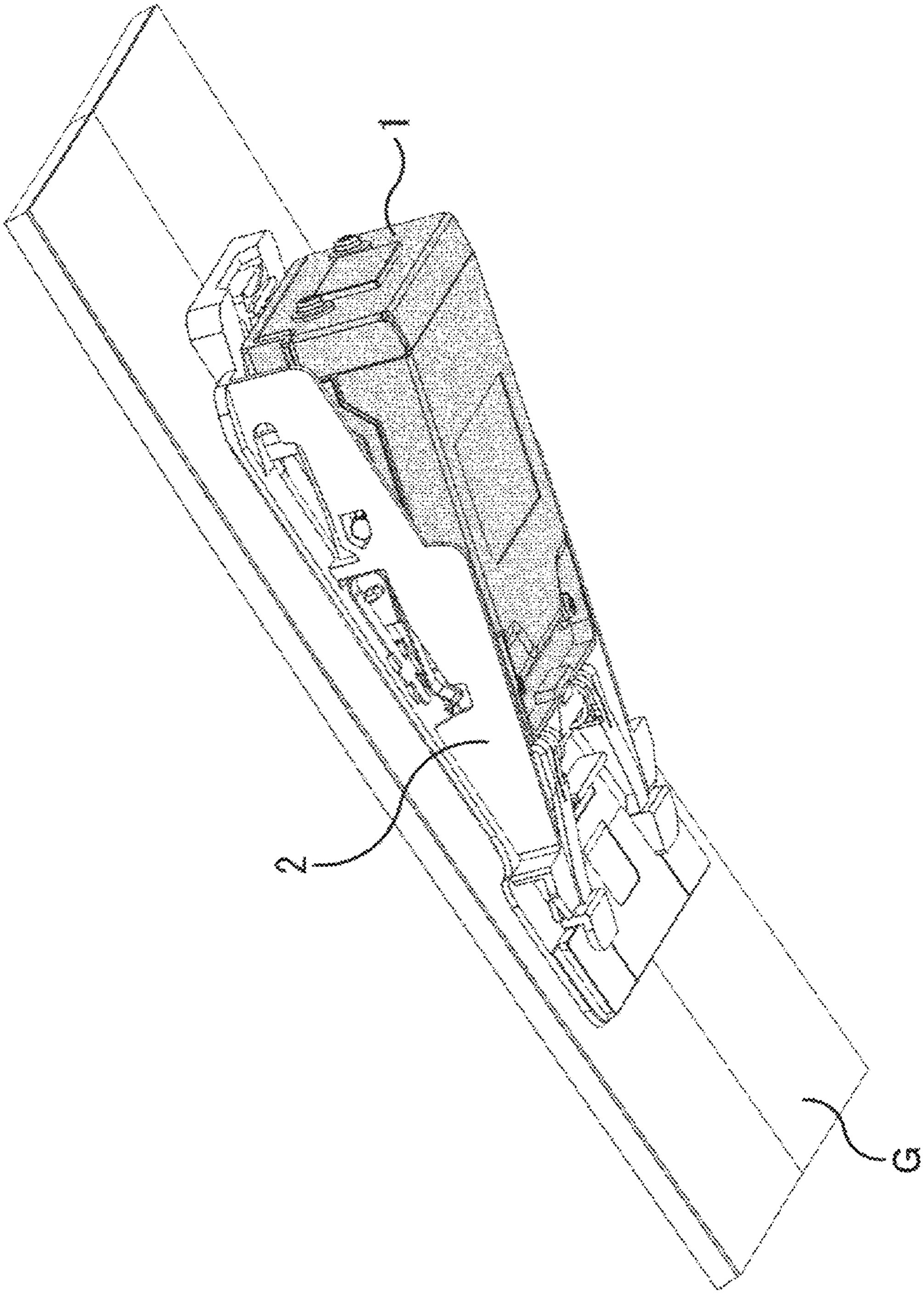
FIG. 3 is a view of a state where the front camera is mounted to a bracket.

The front camera 1 is mounted to the bracket 2 such that the lens 21 faces forward with respect to the vehicle, as shown as a colored portion in FIG. 3. In other words, the front camera 1 is mounted in such a manner as to be able to take an image of an outside and forward view of the vehicle through the windshield G. The front camera 1 mounted to the bracket 2 is connected to a control unit mounted to the vehicle, for example, by wire.

The front camera 1 has functions of analyzing the projected image captured during traveling of the vehicle and recognizing various kinds of objects including roads, pedestrians, obstacles, and the like. The front camera 1 has not only the image capturing function but also such an image analysis function. In the front camera 1, a Central Processing Unit (CPU) for executing a predetermined program to carry out the image analysis and the like, a memory, and the like are provided.

On the basis of a result of the recognition by the front camera 1, various kinds of processing such as traveling control and provision of information to a driver are performed by the control unit mounted to the vehicle.

<Configurations of Respective Faces of Front Camera>

Configurations of respective faces of the front camera 1 will be described.

Figure 4:
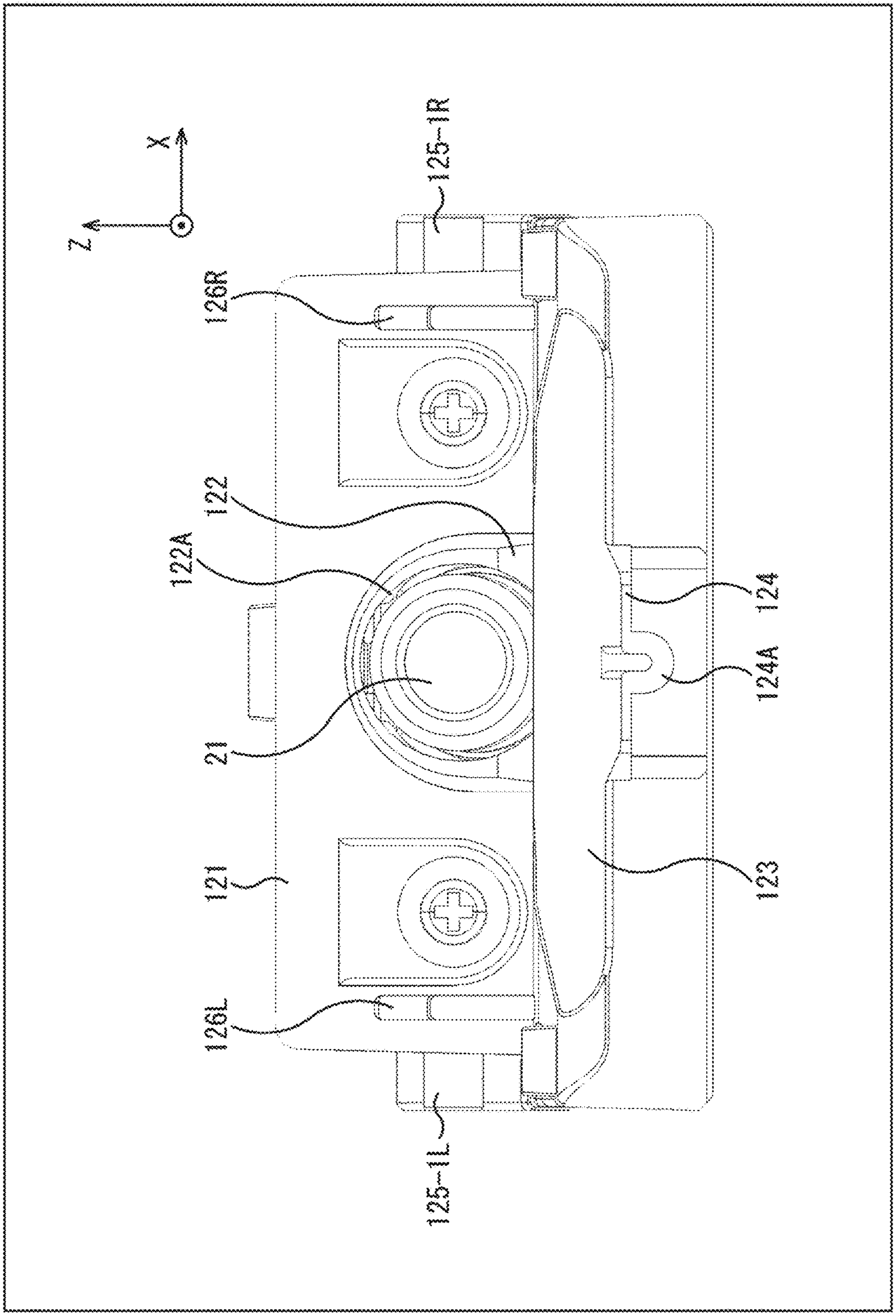
FIG. 4 is a front view of the front camera.
Figure 5:
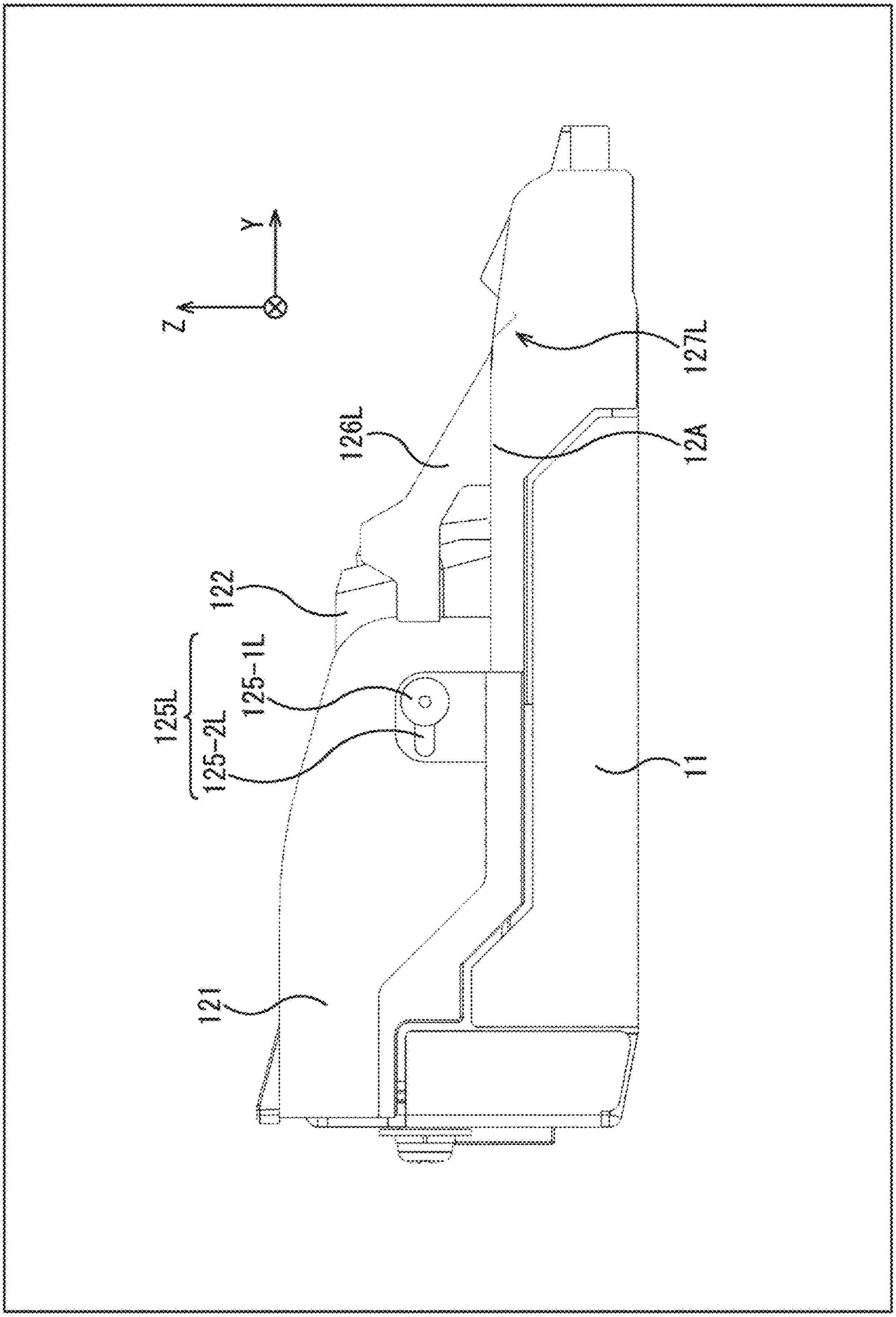
FIG. 5 is a left side view of the front camera.
Figure 6:
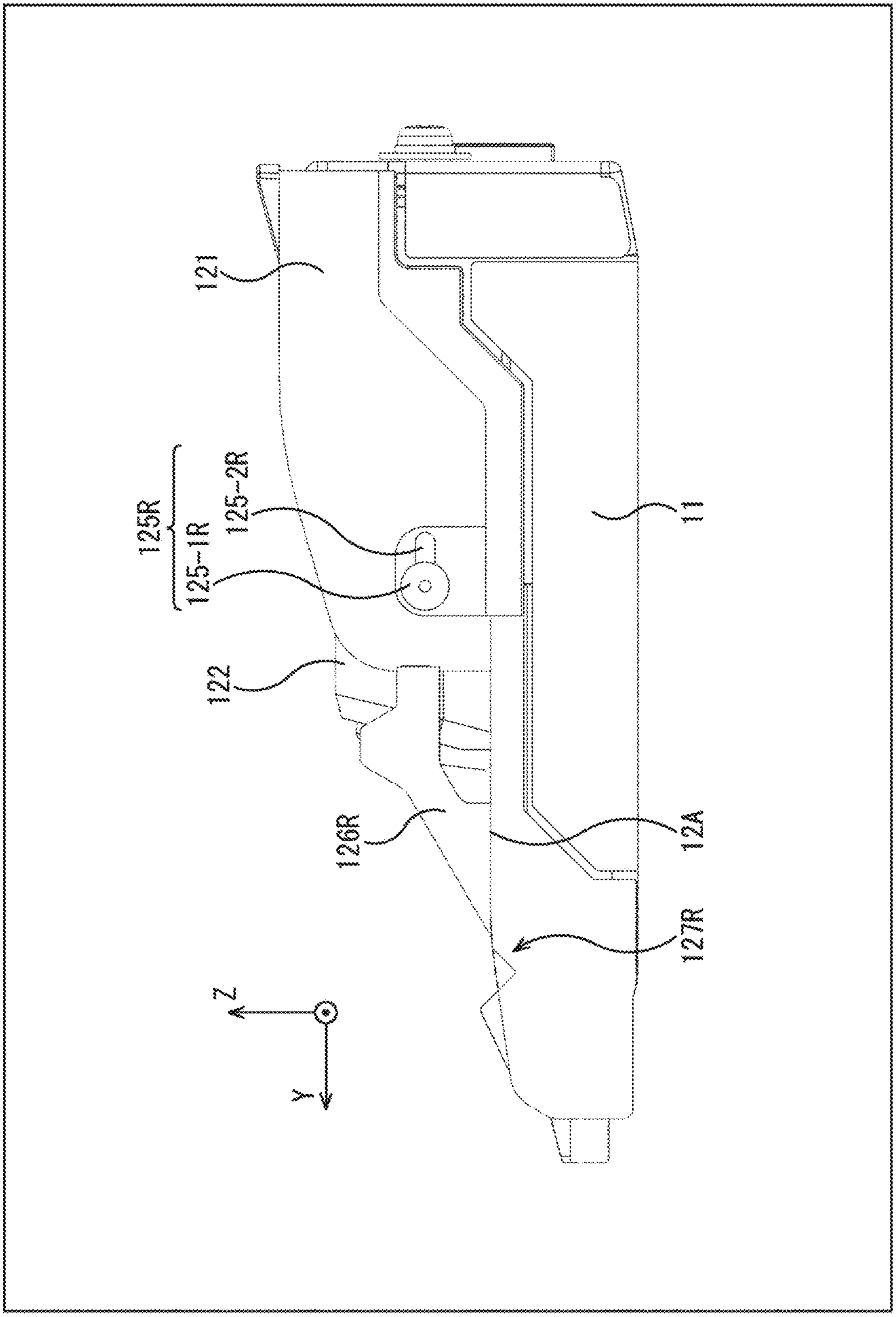
FIG. 6 is a right side view of the front camera.

FIG. 4 is a front view of the front camera 1. FIG. 5 is a left side view of the front camera 1 and FIG. 6 is a right side view of the front camera 1. Descriptions overlapping what have been described with reference to FIG. 1 will be omitted properly.

As shown in FIG. 4, a semicylindrical protruding portion 124A having a substantially U shape in a front view is formed on a bottom face side of the tip end protruding portion 124. A narrow groove is formed in a top face of the tip end protruding portion 124. In FIG. 4, a normal direction along the Z-axis is a direction in which the top face is oriented.

At a position of a left side face (a side face on a viewer's left hand side in the front view) of the housing portion 121 closer to a forward side, a cylindrical protruding portion 125L is formed. As shown in FIG. 5, the protruding portion 125L is formed in a rear of a cylindrical protruding portion 125-1L by integrally forming a flattened laterally-long protruding portion 125-2L. The protruding portion 125-1L is slightly higher than the protruding portion 125-2L in the X-axis direction.

On the other hand, at a position of a right side face (a side face on a viewer's right hand side in the front view) of the housing portion 121 closer to the forward side, a cylindrical protruding portion 125R is formed. As shown in FIG. 6, the protruding portion 125R is formed in a rea of a cylindrical protruding portion 125-1R by integrally forming a flattened laterally-long protruding portion 125-2R in a right side view. The protruding portion 125-1R is slightly higher than the protruding portion 125-2R in the X-axis direction.

The front camera 1 is positionally aligned by inserting the tip end protruding portion 124 formed on a front face of the front camera 1 and the protruding portions 125L and 125R formed on the left and right opposite side faces into hole portions formed in corresponding positions of the bracket 2.

As shown in FIG. 5, on a front face side of the housing portion 121, a connecting portion 126L is formed between a front face of the housing portion 121 and the top face portion 12A. In a forward part of the connecting portion 126L, a substantially V-shaped notch portion 127L is formed.

On the other hand, as shown in FIG. 6, on the front face side of the housing portion 121, a connecting portion 126R is formed between the front face of the housing portion 121 and the top face portion 12A. In a forward part of the connecting portion 126R, a substantially V-shaped notch portion 127R is formed.

The notch portion 127L and the notch portion 127R are also used in the mounting to the bracket 2.

Figure 7:
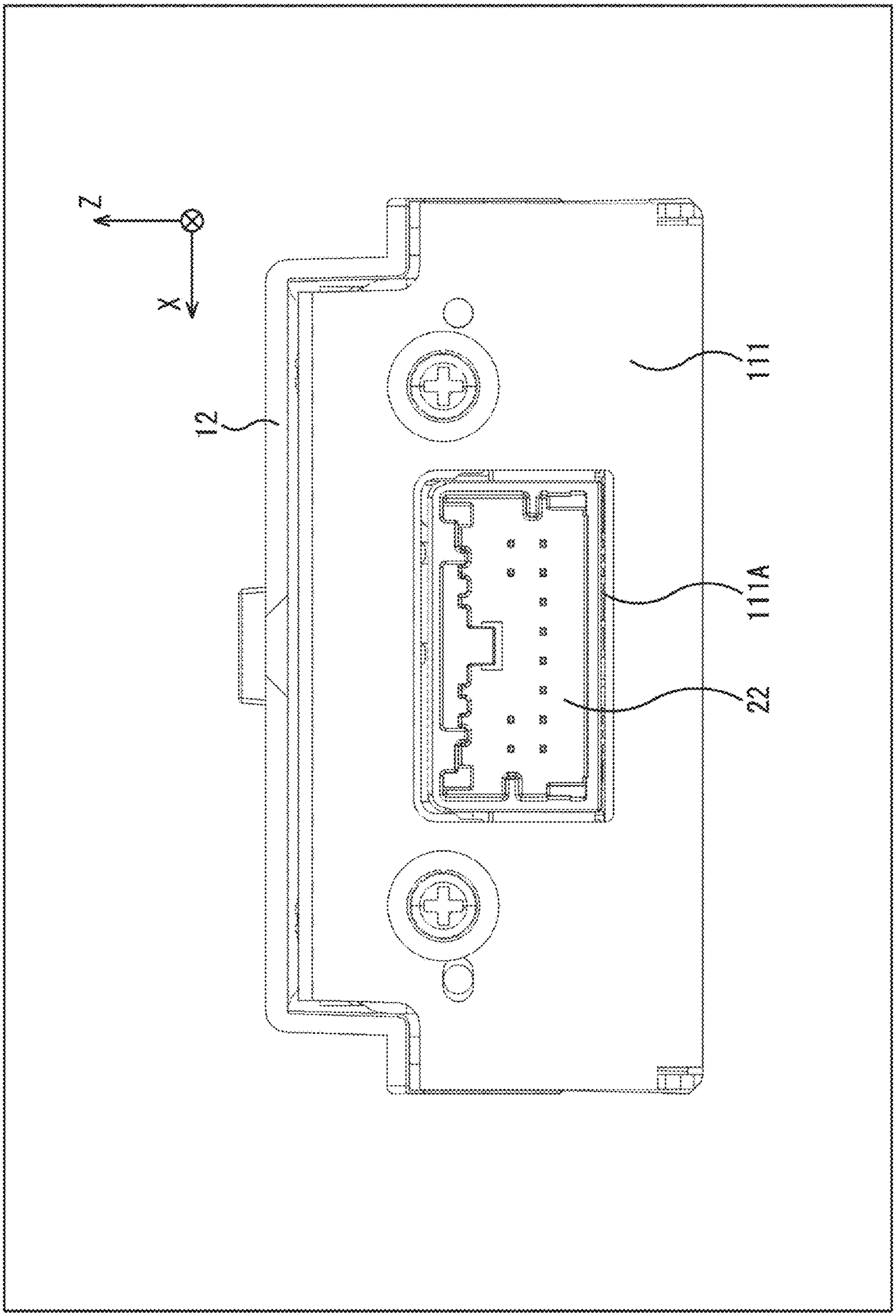
FIG. 7 is a back view of the front camera.

FIG. 7 is a back view of the front camera 1.

A back face of the front camera 1 is formed by being covered with a back face portion 111 of the bottom plate 11. A laterally long rectangular hole portion 111A is formed substantially at a center of the back face portion 111 that is in a laterally long (long in the X-axis direction) bilaterally-symmetric victory stand shape, and a terminal 22 is formed in the hole portion 111A. A cable that connects the front camera 1 and the control unit is connected to the terminal 22.

Figure 8:
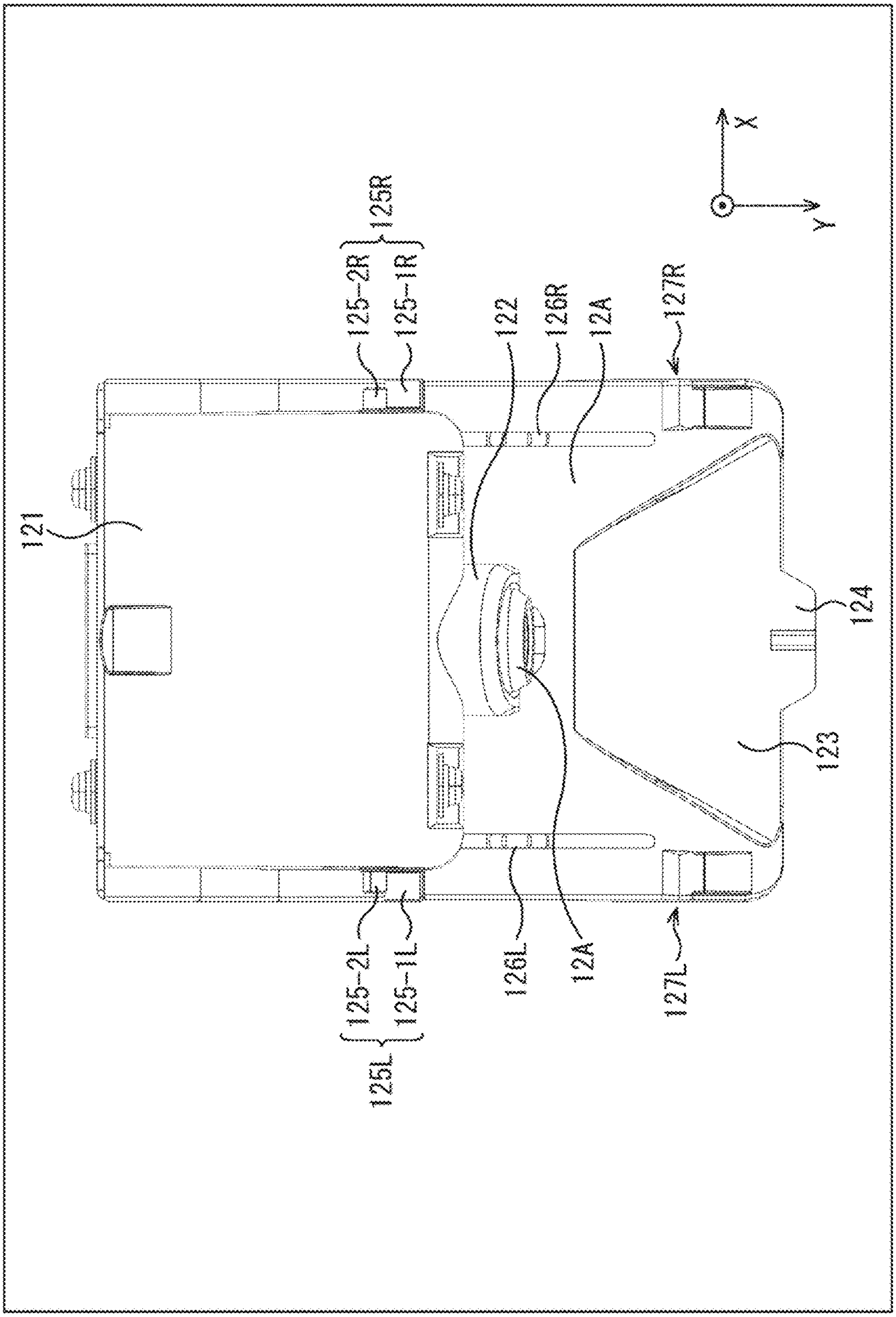
FIG. 8 is a plan view of the front camera.
Figure 9:
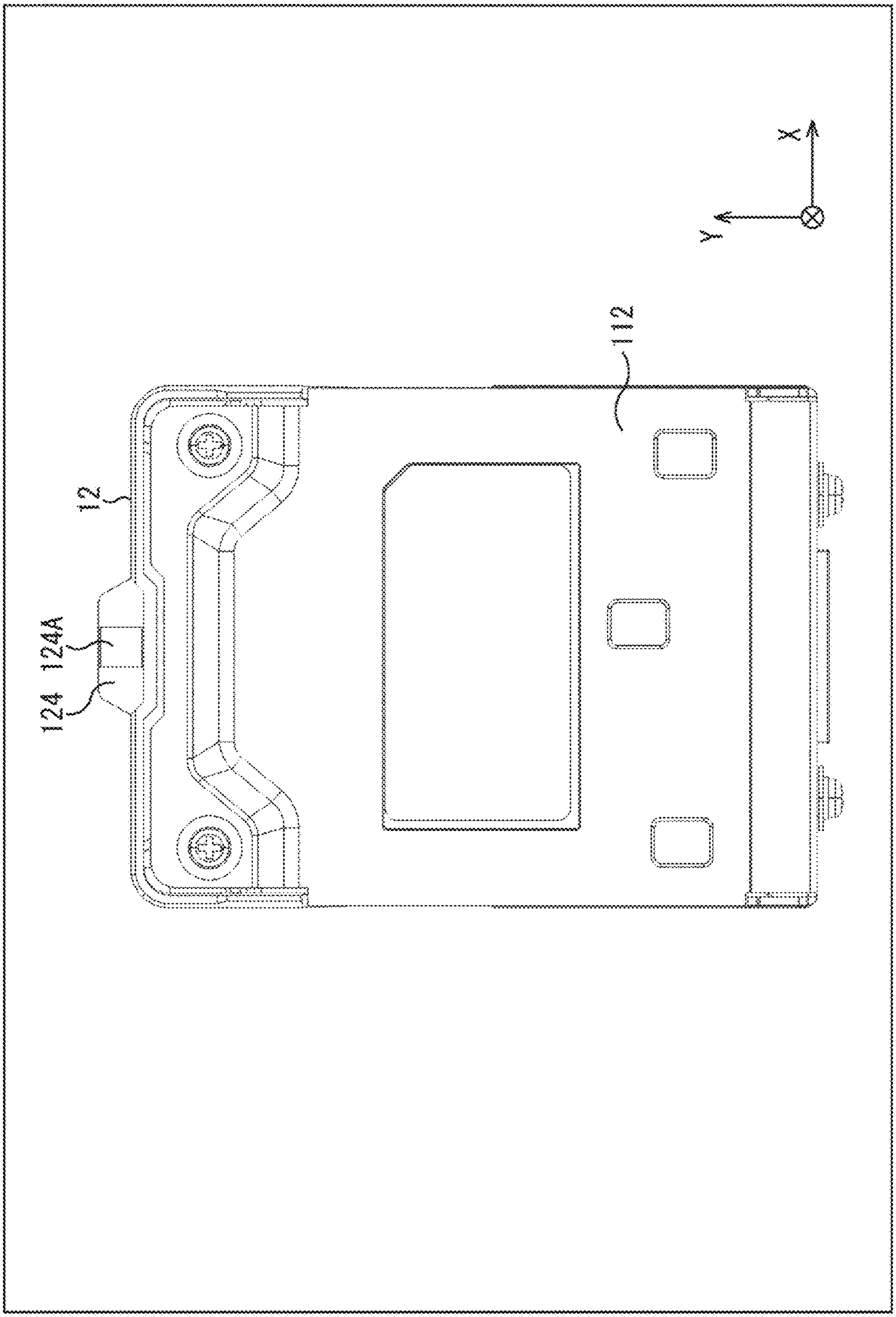
FIG. 9 is a bottom view of the front camera.

A plan configuration of the front camera 1 is shown in FIG. 8 and a bottom configuration of the front camera 1 is shown in FIG. 9.

As shown in FIG. 8, the housing portion 121 is formed in an almost entire area behind a substantially central position of the front camera 1 while leaving narrow marginal portions on left and right sides.

Furthermore, the protruding portion 125L and the protruding portion 125R are formed at substantially central positions in a front-rear direction (a Y-axis direction) of the front camera 1. The notch portion 127L is formed in a forward left end of the front camera 1 and the notch portion 127R is formed in a forward right end of the front camera 1.

As shown in FIG. 9, the bottom face of the front camera 1 is formed by being covered with a bottom face portion 112 of the bottom plate 11. The protruding portion 124A having a cylindrical face is formed on the bottom face side of the tip end protruding portion 124 provided at a center of the front face of the front camera 1.

<Internal Structure of Front Camera>

Figure 10:
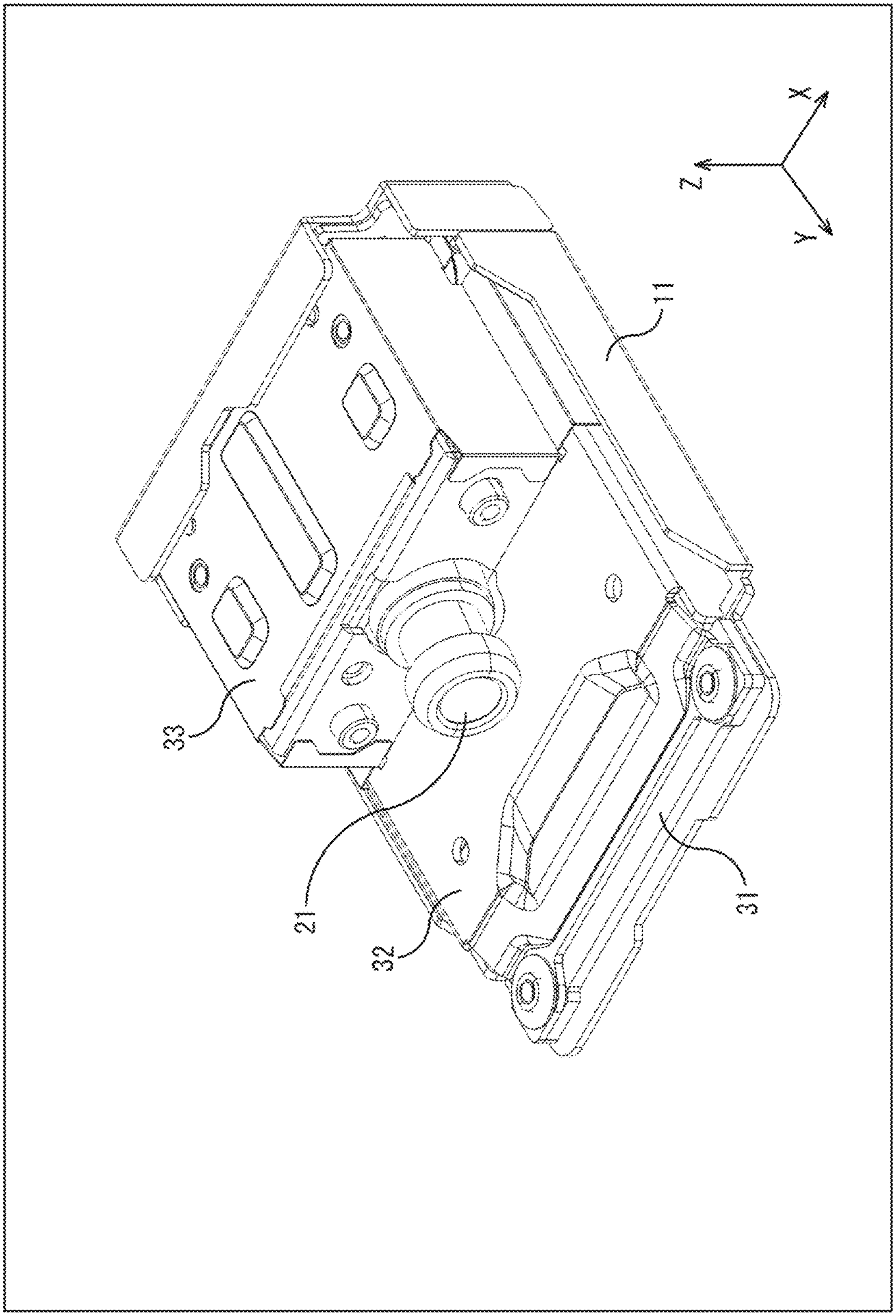
FIG. 10 is a view of a state where a front case is detached.

FIG. 10 is a view of a state of the front camera 1 from which a front case 12 is detached.

As shown in FIG. 10, a main board 31, a top plate 32, and a shield plate 33 are provided in the front camera 1.

On the main board 31, various kinds of electronic components such as a CPU and a memory are provided. The lens module is electrically connected to the main board 31. The top plate 32 is formed by processing, for example, a thin plate member including aluminum, similarly to the bottom plate 11. The shield plate 33 is formed by, for example, processing a thin plate member such as stainless steel.

Figure 11:
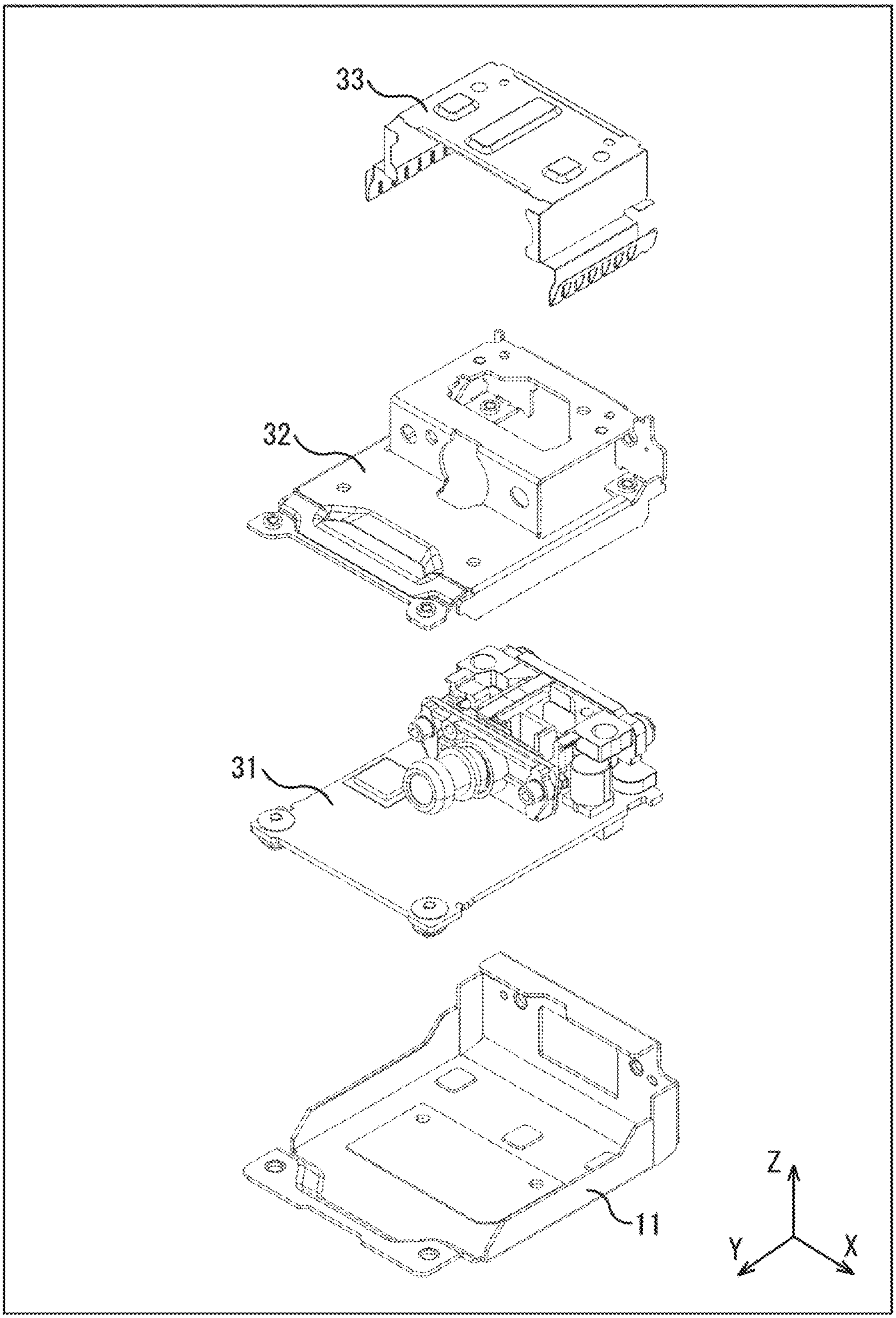
FIG. 11 is a view of a state where a main board, a top plate, and a shield plate are detached.

A state where the main board 31, the top plate 32, and the shield plate 33 are detached is shown in FIG. 11.

As shown in FIG. 11, the main board 31 is covered with the top plate 32 and the shield plate 33 from above and fixed to the bottom plate 11 by screwing the main board 31 together with the top plate 32. The shield plate 33 is screwed to the top plate 32. The top plate 32 is of such size and shape as to cover almost the entire main board 31.

The shield plate 33 is put on the top plate 32 in such a manner as to close an opening in a bent portion formed at a position closer to a rear side of the top plate 32, and the shield plate 33 is screwed. The top plate 32 covers almost the entire main board 31. The opening in the top plate 32 is closed with the shield plate 33. With the top plate 32, the shield plate 33, and the bottom plate 11, the electronic components on the main board 31 can be shielded from surroundings.

Figure 12:
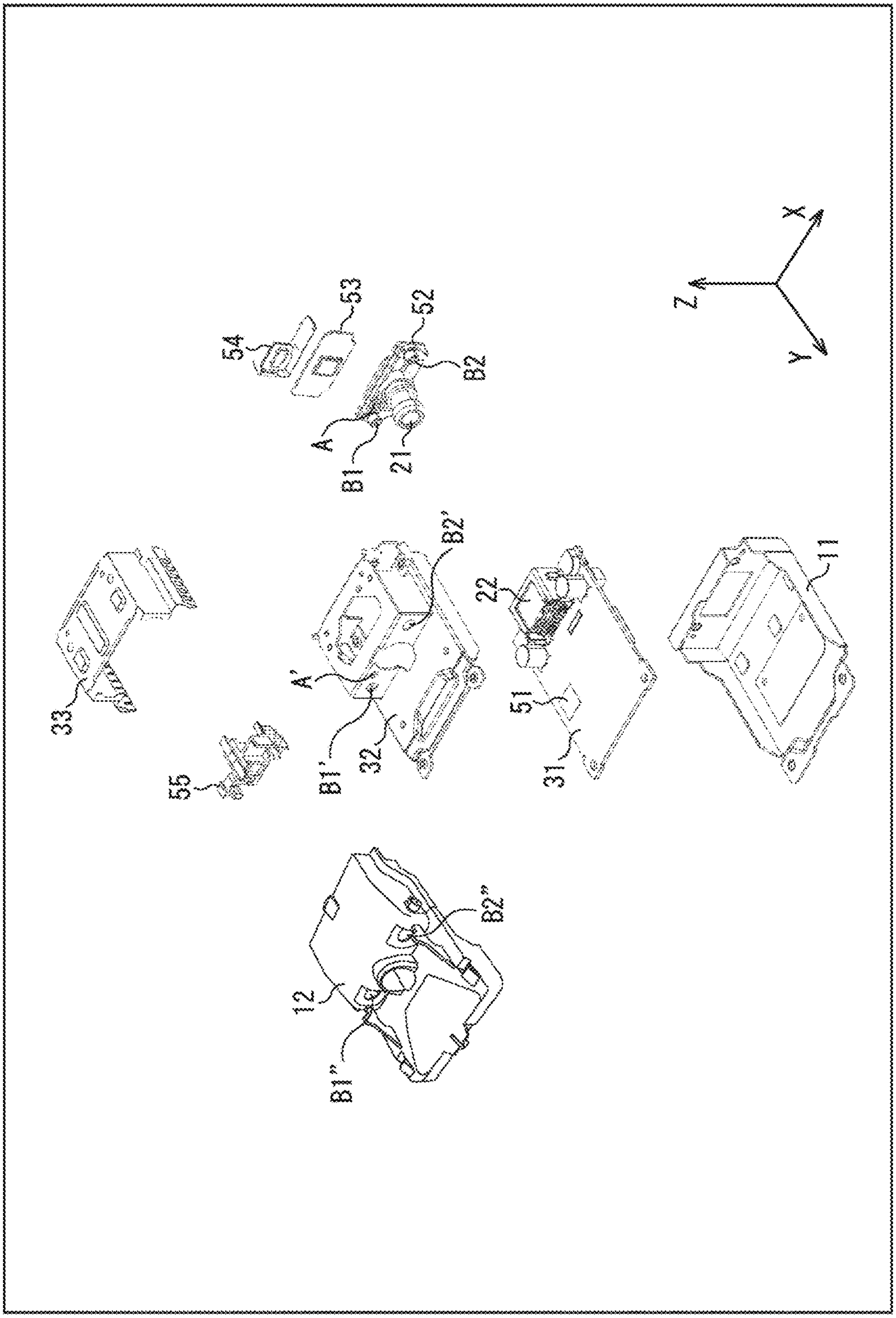
FIG. 12 is an exploded view of the front camera.

FIG. 12 is an exploded view of the front camera 1. Main parts and an assembly method will be described.

As shown in FIG. 12, an LSI 51 is installed on the main board 31. An imager board 53 on which an image sensor is installed is mounted to the lens module 52. Moreover, a flexible cable 54 is mounted to the imager board 53. The flexible cable 54 is a cable that connects the main board 31 and the imager board 53 on which the image sensor is installed.

The lens module 52 is screwed to the top plate 32 by use of threaded holes A, A'. After the lens module 52 is mounted to the top plate 32, the flexible cable 54 is mounted to the main board 31.

A holder 55 is a part for fixing the flexible cable 54. The holder 55 presses the flexible cable 54 mounted to connect the main board 31 and the imager board 53 from above to thereby fix the flexible cable 54. The hole portion in a top face of the top plate 32 is formed so that the holder 55 is put into the top plate 32.

Thereafter, the shield plate 33 and the top plate 32 are secured with metal screws, and the top plate 32, the main board 31, and the bottom plate 11 are secured with metal screws. Note that the top face of the top plate 32 is in contact with a back side of a top face of the shield plate 33 and it is possible to pass a current between the top plate 32 and the shield plate 33.

Thereafter, the front case 12 is screwed to the top plate 32 and the lens module 52 by use of threaded holes B1, B1', B1", B2, B2', B2".

<Configurations of Respective Plates>

Here, details of the bottom plate 11, the top plate 32, and the shield plate 33 forming a shield structure of the front camera 1 will be described.

Configuration of Bottom Plate

Figure 13:
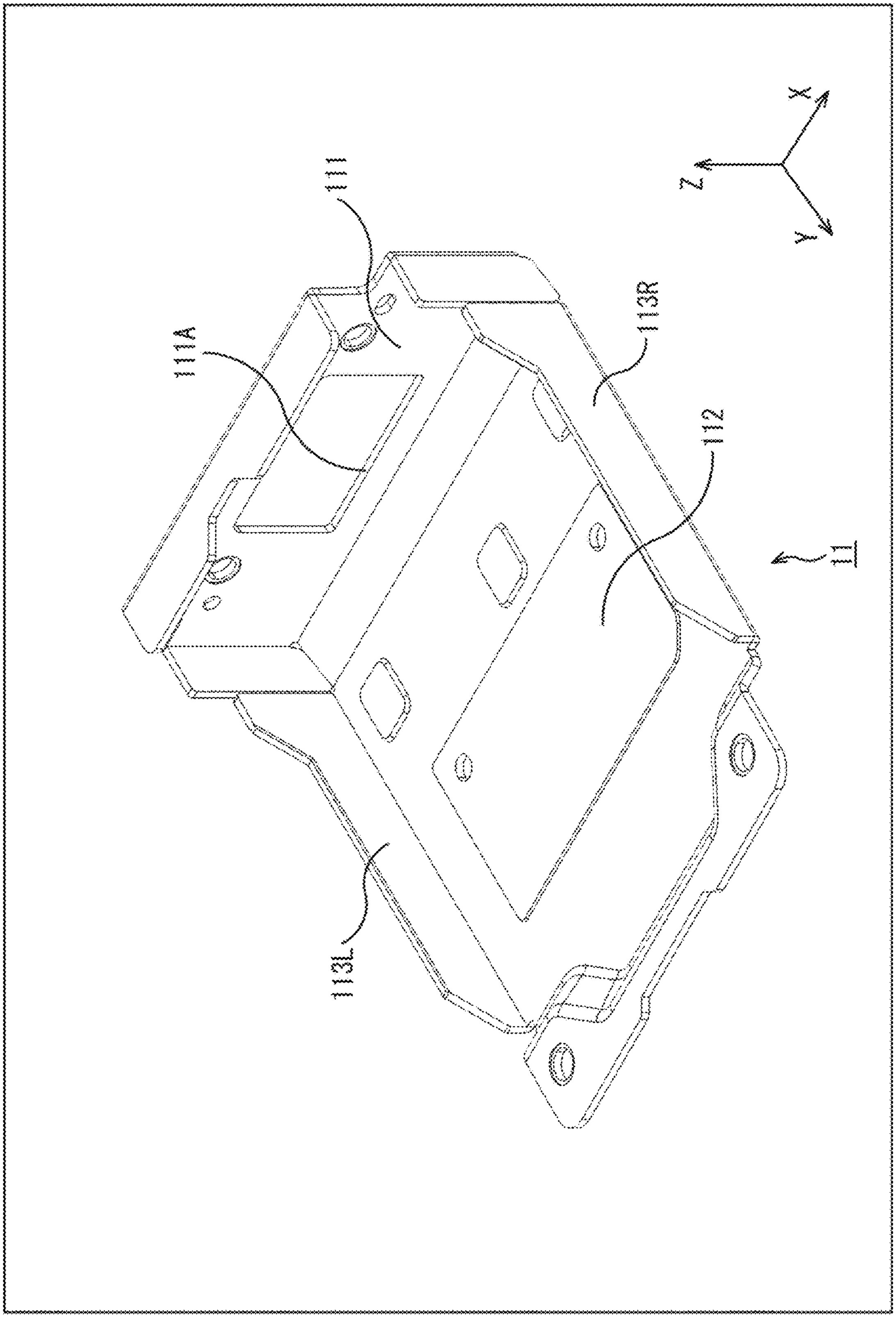
FIG. 13 is an enlarged perspective view of a bottom plate.

FIG. 13 is an enlarged perspective view of the bottom plate 11.

As shown in FIG. 13, at a left end and a right end of the bottom plate 11, a left edge portion 113L and a right edge portion 113R that are laterally-long (in the Y-axis direction) band-shaped wall faces are respectively formed by bending a thin plate member vertically upward (in the normal direction along the Z-axis) with respect to a horizontal face of the bottom face portion 112. Tip ends of the left edge portion 113L and the right edge portion 113R are formed to be inclined forward.

A forward side of the bottom face portion 112 is formed in a substantially prow shape in the side view by being curved to be a raised bottom. On a back face side of the bottom face portion 112, a back face portion 111 higher than the left edge portion 113L and the right edge portion 113R in the Z-axis direction is formed.

Configuration of Top Plate

Figure 14:
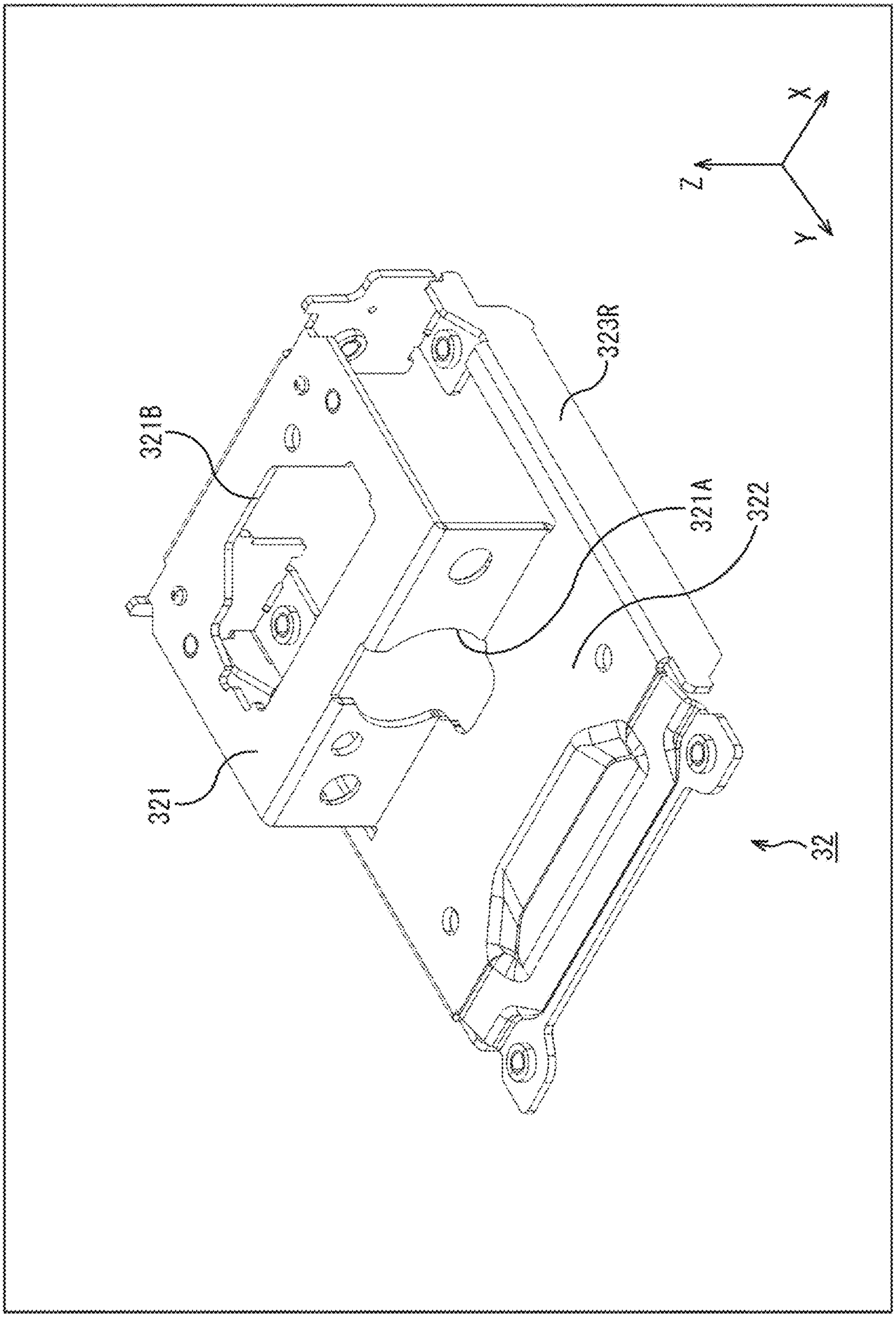
FIG. 14 is an enlarged perspective view of the top plate.
Figure 15:
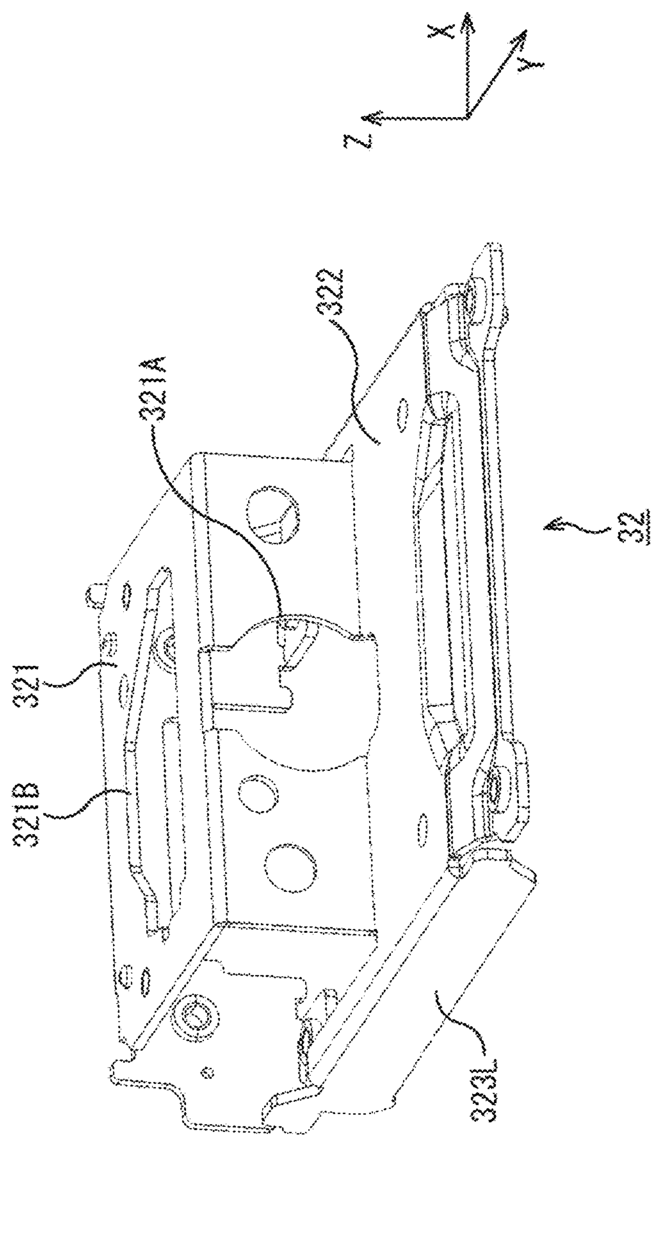
FIG. 15 is another enlarged perspective view of the top plate.

FIGS. 14, 15 are enlarged perspective views of the top plate 32.

As shown in FIGS. 14, 15, at a portion of the top plate 32 closer to a rear side, a bent portion 321 is formed by bending a thin plate member. A substantially vertical face is formed on a front side of the bent portion 321 and a substantially horizontal face is formed on top of the bent portion 321. The bent portion 321 is open on a left side face side and a right side face side.

A lens hole 321A in a substantially circular shape in a front view is formed substantially at a center of the vertical face formed on the front side of the bent portion 321 and the substantially trapezoidal mounting hole 321B is formed in the top face. The lens hole 321A is a hole portion through which the lens 21 of the lens module 52 is inserted from an inside of the bent portion 321. The mounting hole 321B is formed so that the holder 55 is put into the top plate 32 from above as described above.

At a left end and a right end of the top plate 32, a left edge portion 323L and a right edge portion 323R that are laterally-long (in the Y-axis direction) band-shaped wall faces are respectively formed by bending a thin plate member vertically downward with respect to the top face portion 322 forming a horizontal face. Heights of the left edge portion 323L and the right edge portion 323R in the Z-axis direction are substantially the same as heights of the left edge portion 113L and the right edge portion 113R of the bottom plate 11 in the Z-axis direction.

Configuration of Shield Plate

Figure 16:
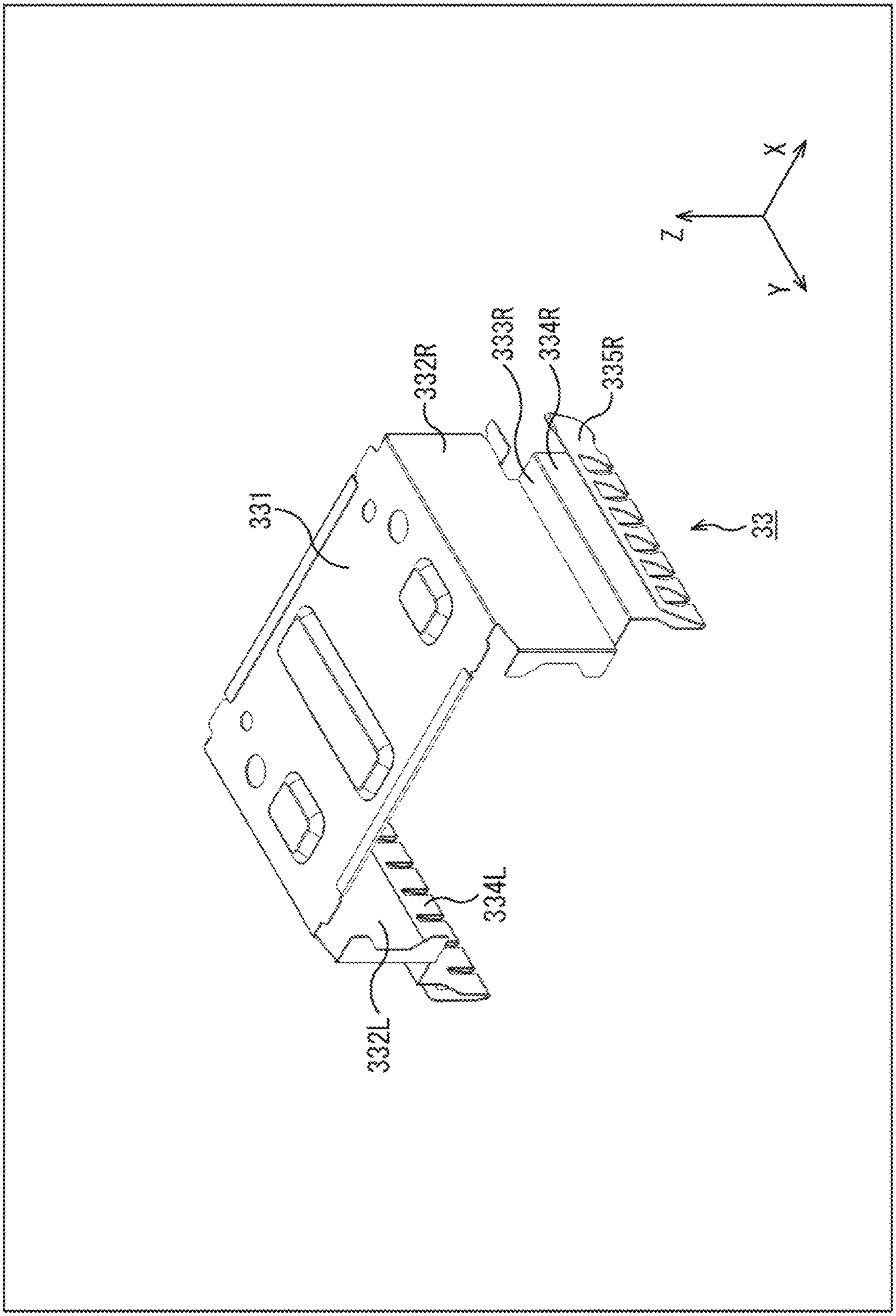
FIG. 16 is an enlarged perspective view of the shield plate.

FIG. 16 is an enlarged perspective view of the shield plate 33. A state of the shield plate 33 seen from the front is shown in FIG. 17.

Figure 17:
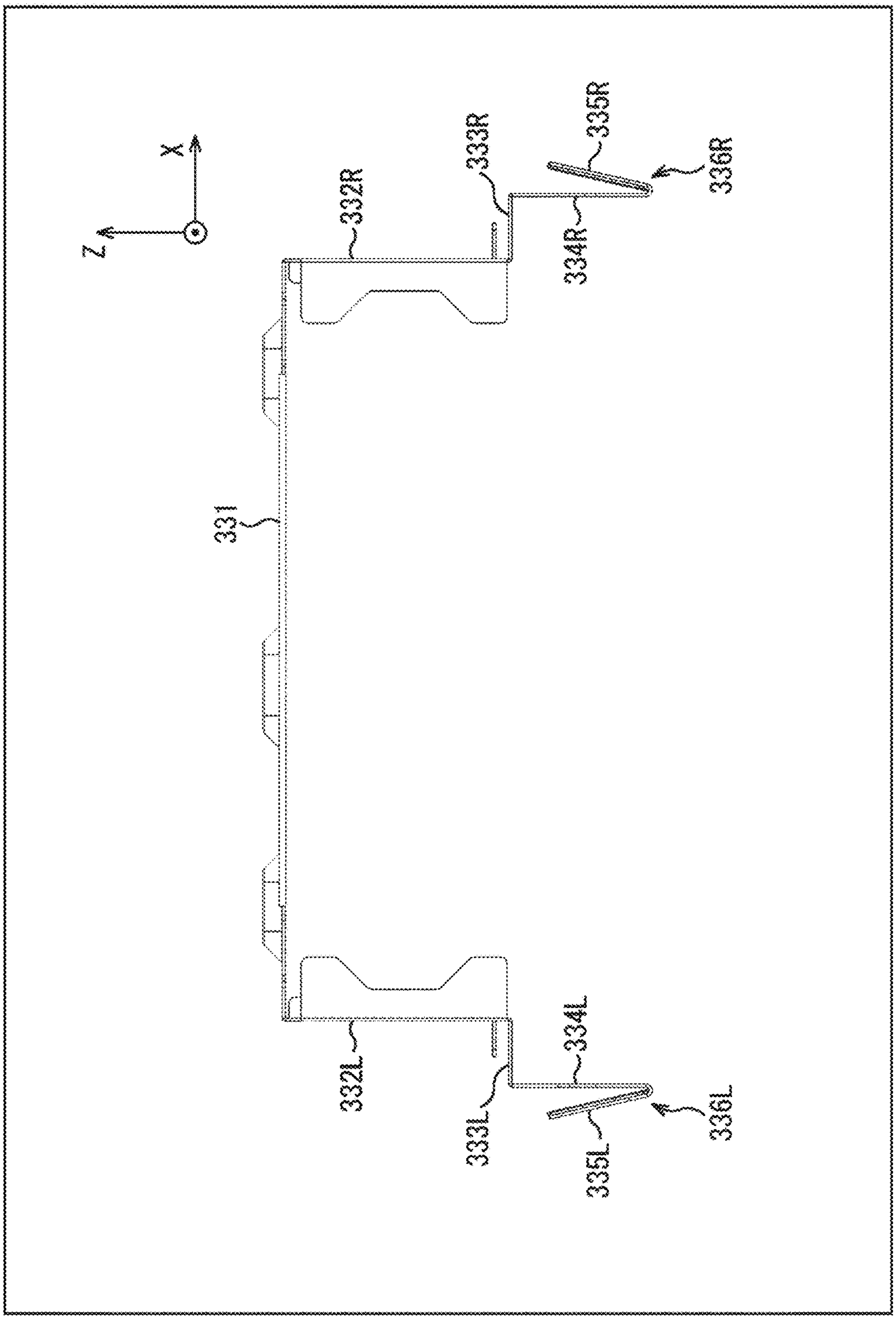
FIG. 17 is an enlarged front view of the shield plate.

As shown in FIG. 17, the shield plate 33 is formed by bending a thin plate member into a substantially bilaterally-symmetric victory stand shape in the front view.

In other words, a left side face portion 332L forming a vertical face is formed on a left side face side of a top face portion 331 forming a horizontal face and a band-shaped portion 333L forming a narrow horizontal face is formed at a lower end of the left side face portion 332L. At a left end of the band-shaped portion 333L, a bend portion 336L in a substantially V shape in the front view is formed.

The bend portion 336L includes a vertical face 334L and a slope 335L. Six slits (notches) are formed at equal intervals in the vertical face 334L and the slope 335L. The vertically-long slits in vertically-inverted (in the Z-axis direction) U shapes are formed in the vertical face 334L and the slits slightly widening in the Y-axis direction as they extend upward are formed in the slope 335L.

As the slits are formed, the bend portion 336L is formed in a substantially comb teeth shape. Due to the slits, the bend portion 336L has ductility (flexibility) against a force applied from the left.

A right side face side of the shield plate 33 is formed similarly to the left side face side. In other words, a right side face portion 332R forming a vertical face is formed on a right side face side of the top face portion 331 and a band-shaped portion 333R forming a narrow horizontal face is formed at a lower end of the right side face portion 332R. At a right end of the band-shaped portion 333R, a bend portion 336R in a substantially V shape in the front view is formed.

The bend portion 336R includes a vertical face 334R and a slope 335R. Six slits are formed at equal intervals in the vertical face 334R and the slope 335R. The vertically long slits in vertically-inverted (in the Z-axis direction) U shapes are formed in the vertical face 334R and the slits slightly widening in the Y-axis direction as they extend upward are formed in the slope 335R.

As the slits are formed, the bend portion 336R is also formed in a substantially comb teeth shape. Due to the slits, the bend portion 336R has ductility (flexibility) against a force applied from the right.

The bottom plate 11, the top plate 32, and the shield plate 33 having such configurations are combined as described with reference to FIGS. 10, 11.

When the top plate 32 is put on, the left edge portion 323L and the right edge portion 323R of the top plate 32 are respectively positioned on inner sides of the left edge portion 113L and the right edge portion 113R of the bottom plate 11. Small clearances are respectively formed between the left edge portion 323L of the top plate 32 and the left edge portion 113L of the bottom plate 11 and between the right edge portion 323R of the top plate 32 and the right edge portion 113R of the bottom plate 11.

The bent portion 321 of the top plate 32 is covered with the shield plate 33 from above.

Figure 18:
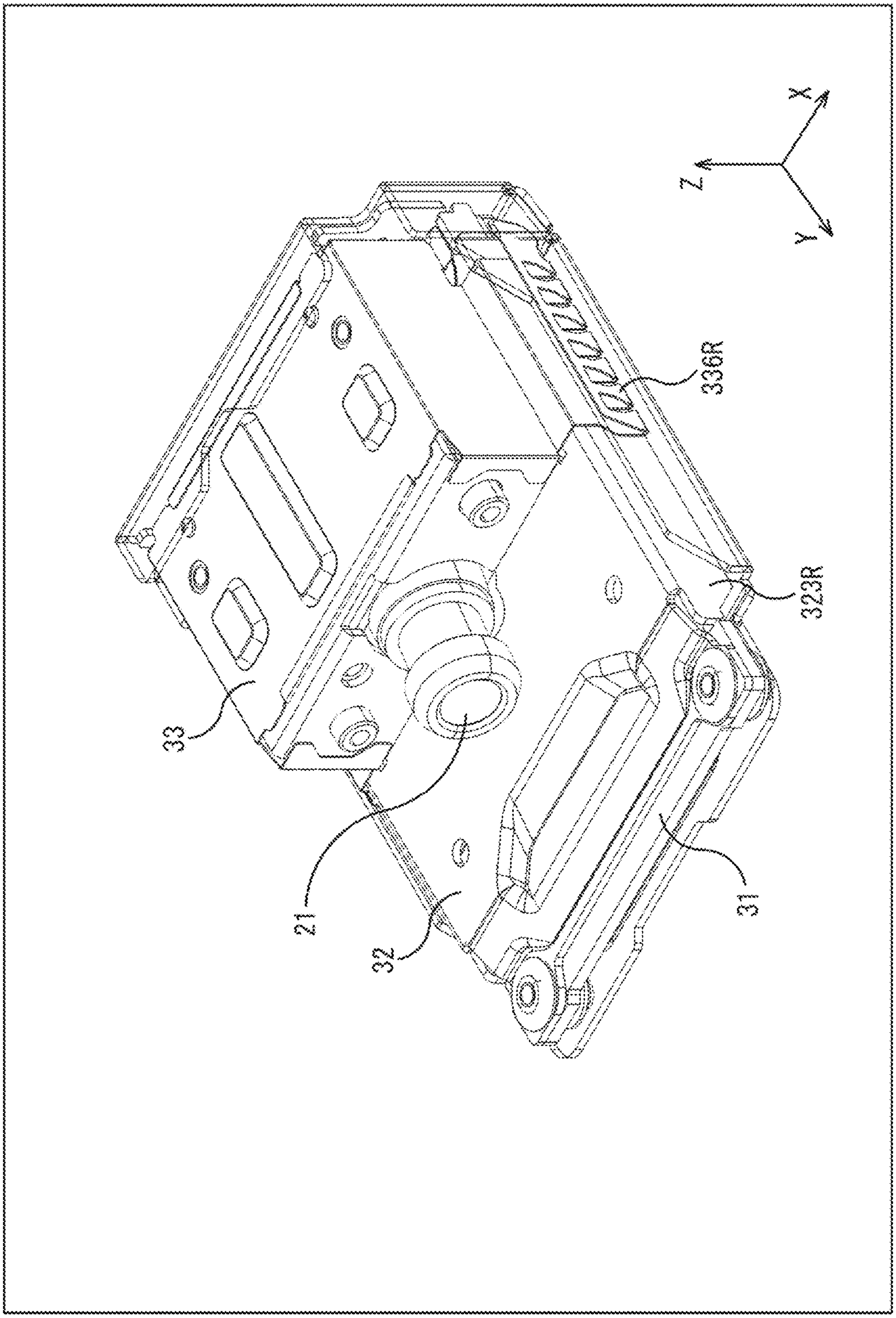

FIG. 18 is a view of a state where the bottom plate 11 is covered with the top plate 32 and the shield plate 33. For the sake of convenience of explanation, the bottom plate 11 is transparent in FIG. 18.

The shield plate 33 is mounted to the top plate 32. If the top plate 32, the shield plate 33, and the bottom plate 11 are assembled, the bend portion 336L is inserted into the clearance between the left edge portion 323L of the top plate 32 and the left edge portion 113L of the bottom plate 11 and the bend portion 336R is inserted into the clearance between the right edge portion 323R of the top plate 32 and the right edge portion 113R of the bottom plate 11. The bend portion 336L and the bend portion 336R function as insertion portions that close the clearances between the top plate 32 and the bottom plate 11.

When the shield plate 33 is put on the top plate 32, the mounting hole 321B formed in the top face of the bent portion 321 is closed with the top face portion 331 of the shield plate 33. Furthermore, the openings on the left side face side and the right side face side of the bent portion 321 are respectively closed with the left side face portion 332L and the right side face portion 332R of the shield plate 33. Therefore, the electronic components on the main board 31 are shielded.

<Internal Configuration>

Figure 19:
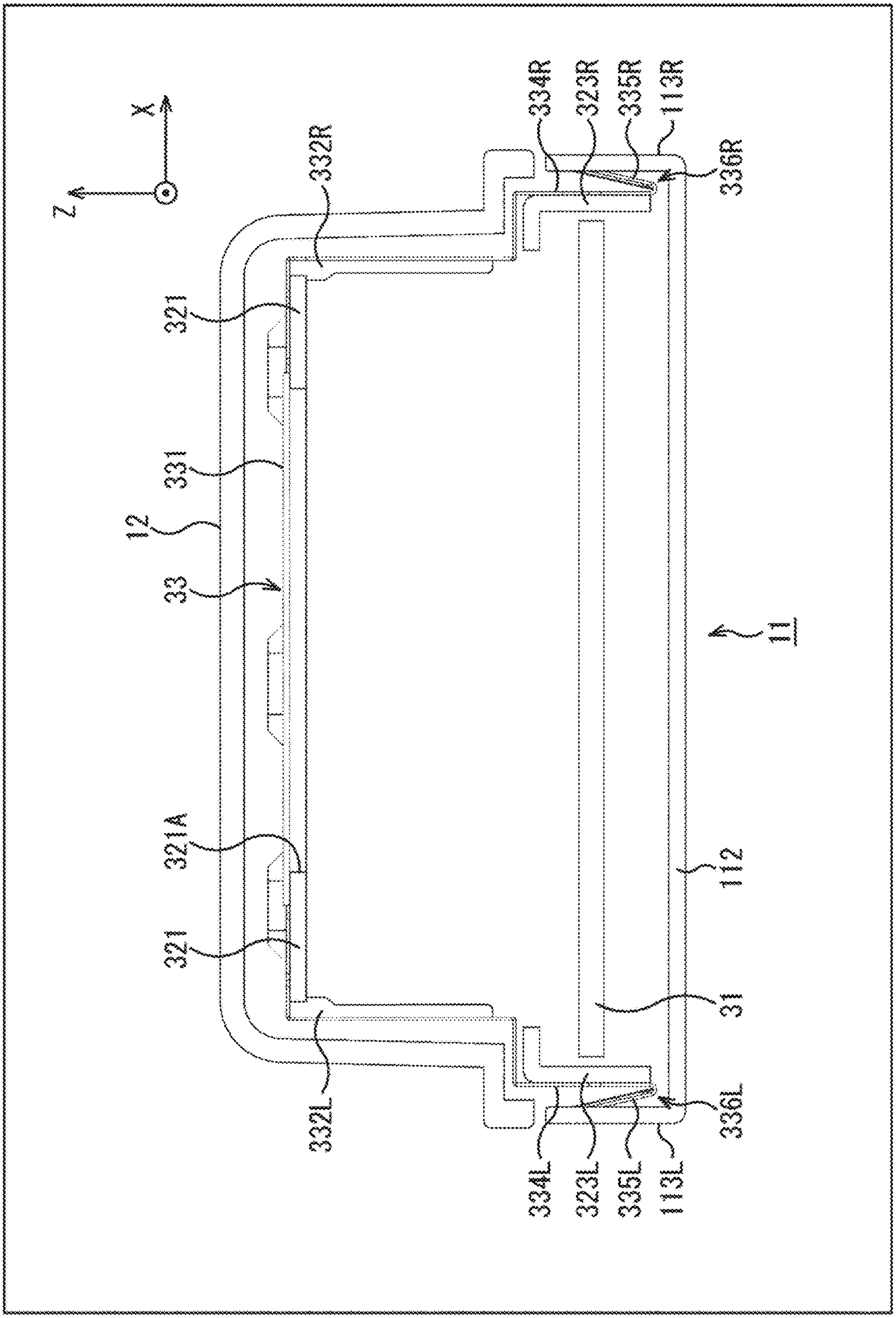
FIG. 19 is a view showing a configuration of a section of the front camera.

FIG. 19 is a view showing a configuration of a section of the front camera 1 along line A-A (FIG. 1). In FIG. 19, details of the configuration appearing in the section are not shown.

A width on an open side of the bend portion 336L (a distance between the vertical face 334L and a tip end of the slope 335L) before the assembly is slightly greater than a width of the clearance between the bottom plate 11 and the top plate 32. As shown in a lower left portion of FIG. 19, an upper end of the slope 335L of the bend portion 336L formed in the substantially V shape in the front view comes in contact with an inner side of the left edge portion 113L of the bottom plate 11. With this contact, it becomes possible to establish electrical conduction between the shield plate 33 and the bottom plate 11 via the bend portion 336L.

Furthermore, a width on an open side of the bend portion 336R (a distance between the vertical face 334R and a tip end of the slope 335R) before the assembly is slightly greater than a width of the clearance between the bottom plate 11 and the top plate 32. As shown in a lower right portion of FIG. 19, an upper end of the slope 335R of the bend portion 336R formed in the substantially V shape in the front view comes in contact with an inner side of the right edge portion 113R of the bottom plate 11. With this contact, it becomes possible to establish electrical conduction between the shield plate 33 and the bottom plate 11 via the bend portion 336R.

The slope 335L of the bend portion 336L comes in contact with the inner side of the left edge portion 113L of the bottom plate 11 and the slope 335R of the bend portion 336R comes in contact with the inner side of the right edge portion 113R of the bottom plate 11 to thereby close the clearances between the bottom plate 11 and the top plate 32.

Because it becomes possible to establish the electrical conduction between the shield plate 33 and the bottom plate 11 via the bend portion 336R/336L, it becomes possible to establish the electrical conduction between the shield plate 33, the top plate 32, and the bottom plate 11. Therefore, it is possible to shield electromagnetic wave radiated by the electronic components on the main board 31 and it is possible to prevent influences of disturbance noise.

Figure 20:
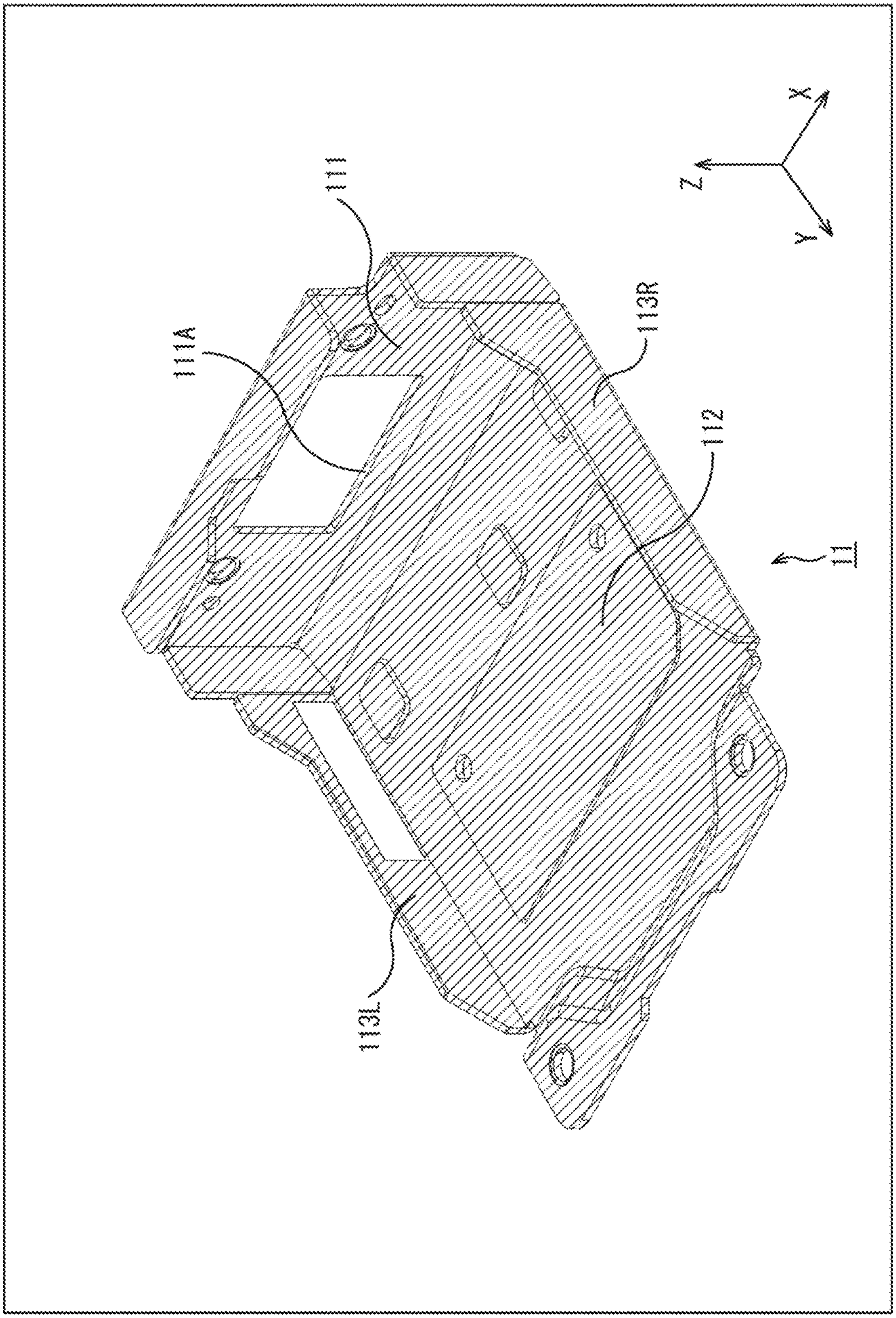
FIG. 20 is a view showing an example of a painted portion of the bottom plate.

FIG. 20 is a view showing an example of a painted portion of the bottom plate 11.

In FIG. 20, a hatched portion is the portion painted with a predetermined color such as black or a portion that can be painted. Normally, an outer side of the bottom plate 11 is painted. As can be seen from FIG. 20, at least a portion of the inner side of the left edge portion 113L that comes in contact with the bend portion 336L is not painted and the metal thin plate member is exposed as it is. Although it is not shown in the figure, at least a portion of the inner side of the right edge portion 113R that comes in contact with the bend portion 336R is not painted either.

By not painting the inner sides (the portions with which the bend portion 336L, the bend portion 336R come in contact) of the left edge portion 113L and the right edge portion 113R, it is possible to more reliably secure the electric conduction between the bottom plate 11 and the shield plate 33. Besides this configuration, in a case where another portion for securing conduction between the bottom plate 11 and the main board 31 or the top plate 32 is provided on an inner side of the bottom plate 11, the portion may not be painted and the metal thin plate material may be exposed as it is.

Figure 21:
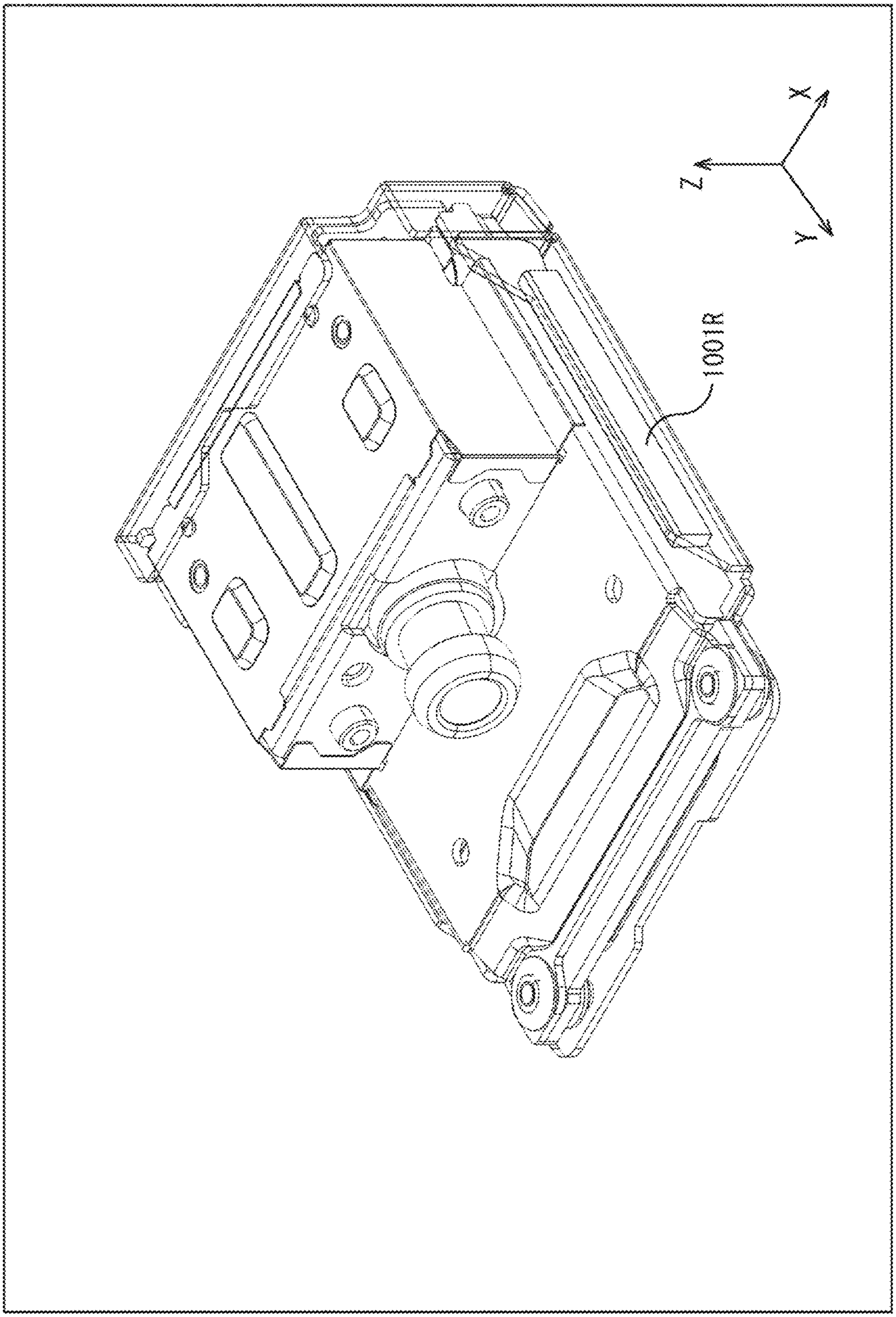
FIG. 21 is a view showing an example of a way to close clearances.
Figure 22:
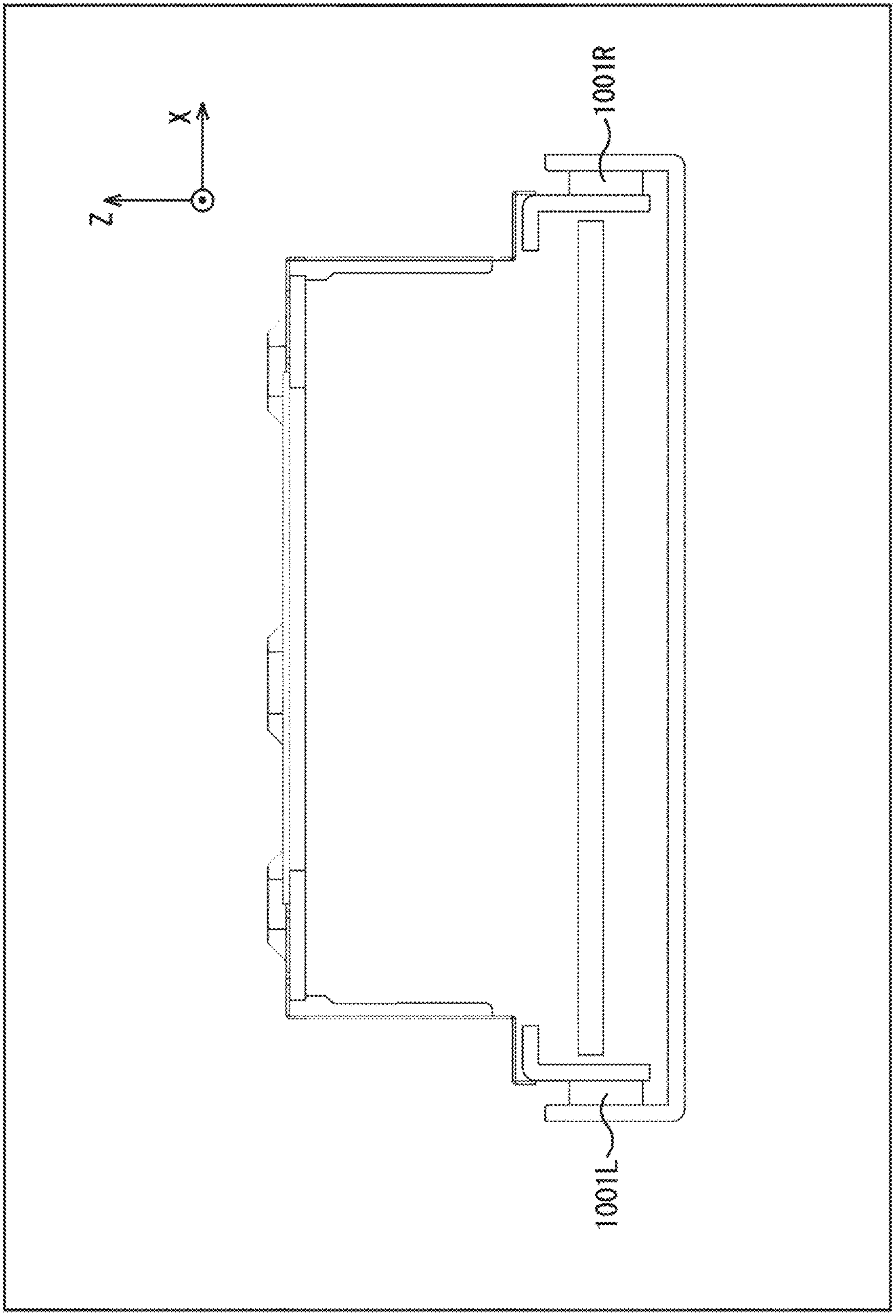
FIG. 22 is a view showing the example of the way to close the clearances.

FIGS. 21 and 22 show an example of the way to close the clearances between the bottom plate 11 and the top plate 32.

As another method of closing the clearance between the bottom plate 11 and the top plate 32 without using the bend portions 336L, 336R of the shield plate 33, a method using shield members such as narrow band-shaped gaskets 1001L, 1001R as shown in FIGS. 21 and 22 is conceivable.

In this case, it is necessary to prepare the shield members. Furthermore, in assembly, it is necessary to carry out the assembly after sticking the shield members to the top plate 32 or the bottom plate 11.

By forming the bend portions 336L, 336R on the shield plate 33 and closing the clearances between the bottom plate 11 and the top plate 32 with the bend portions 336L, 336R as described above, it is possible to suppress the number of parts.

Furthermore, the step of mounting the shield members becomes unnecessary, which facilitates the assembly. Moreover, because the bend portions 336L, 336R are formed in the substantially V shapes in the front view, it is possible to close the clearances between the bottom plate 11 and the top plate 32 with the bend portions 336L, 336R by only fitting the top plate 32 onto which the shield plate 33 is mounted into the bottom plate 11, which facilitates the assembly.

<Modifications>

Although the bend portions 336L, 336R of the shield plate 33 are formed in the substantially V shapes in the front view, the bend portions 336L, 336R may be formed in substantially U shapes.

Furthermore, although widths of the bend portions 336L, 336R in a front-rear direction are substantially the same as a width of the shield plate 33 in the front-rear direction (the Y-axis direction), the bend portions 336L, 336R may be formed to extend forward. Widths of the bend portions 336L, 336R in the front-rear direction (the Y-axis direction) may be greater than the width of the shield plate 33 in the front-rear direction and the clearances between the bottom plate 11 and the top plate 32 may be closed in wider ranges.

Thus, it is possible to more reliably close the clearances between the bottom plate 11 and the top plate 32.

Substantially V-shaped or substantially U-shaped bend portions in the front view and having similar configurations to the bend portions 336L, 336R of the shield plate 33 may be provided to the left edge portion 323L, the right edge portion 323R of the top plate 32. In this case, the clearances between the bottom plate 11 and the top plate 32 are closed with the bend portions provided to the left and right opposite ends of the top plate 32.

Although the shield structure for the onboard camera has been described, the above-described shield structure can be used as a structure for other electronic devices than the onboard camera.

Note that effects described herein are merely examples and not sole effects and other effects may be exerted.

Examples of Combination of Configurations

The present technology may have the following configurations.

(1)

An onboard camera having an internal structure including:

a bottom face plate which forms a bottom face of a housing and has end portions serving as wall faces formed respectively at opposite ends of the bottom face plate;

a board on which an electronic component is installed;

a top face plate which covers the board and has end portions serving as wall faces formed respectively at opposite ends of the top face plate; and a shield plate which has insertion portions formed at opposite ends, the insertion portions being positioned in clearances between the end portions of the bottom face plate and the end portions of the top face plate to close the clearances.

(2)

The onboard camera according to the item (1), in which the bottom face plate, the top face plate, and the shield plate respectively include metal plate members.

(3)

The onboard camera according to the item (2), in which the shield plate has such a shape as to close a hole portion formed in a predetermined face of the top face plate.

(4)

The onboard camera according to the item (2) or (3), in which the insertion portions are formed by bending the metal plate member into V shapes or U shapes.

(5)

The onboard camera according to the item (4), in which a width of an open side of each of the insertion portions before assembly is greater than a width of each of the clearances.

(6)

The onboard camera according to the item (4) or (5), in which a slit is formed in each of the insertion portions.

(7)

The onboard camera according to any one of the items (1) to (6), in which at least a portion of the bottom face plate with which the insertion portions come in contact is not painted.

(8)

The onboard camera according to any one of the items (1) to (7), in which the end portions at the left and right opposite ends of the bottom face plate are respectively formed by bending the metal plate member upward and the end portions at the left and right opposite ends of the top face plate are respectively formed by bending the metal plate member downward.

REFERENCE SIGNS LIST

1 Front camera
11 Bottom plate

12 Front case
31 Main board
32 Top plate
33 Shield plate

The invention claimed is:

1. An onboard camera comprising:

an imaging circuit board including an imaging sensor having a field of view through a windshield of a vehicle when the onboard camera is attached to the windshield of the vehicle;

a main circuit board electrically connected to the imaging circuit board via a flexible connector;

a bottom face plate which forms a bottom face of a housing and has end portions serving as wall faces formed respectively at opposite ends of the bottom face plate;

a top face plate which covers the main circuit board and has end portions serving as wall faces formed respectively at opposite ends of the top face plate; and a shield plate which has insertion portions formed at opposite ends, the insertion portions being positioned in clearances between the end portions of the bottom face plate and the end portions of the top face plate to close the clearances and the insertion portions touching the end portions of the bottom face plate, the shield plate being attached to the top face plate;

wherein the insertion portions of the shield plate each include a first side having a surface facing and in direct contact with one of the wall faces of the top face plate, a second side in contact with one of the end portions of the bottom face plate, and a bend portion connecting the first side and the second side, the bend portion of each of the insertion portions is formed in a substantially V shape or U shape, and the first and second sides of each of the insertion portions of the shield plate are compressed toward each other by the end portions of the bottom face plate and the top face plate, so as to close the clearances and to provide electrical conduction between the shield plate and the bottom face plate.

2. The onboard camera according to claim 1, wherein the bottom face plate, the top face plate, and the shield plate respectively include metal plate members.

3. The onboard camera according to claim 2, wherein the shield plate has such a shape as to close a hole portion formed in a predetermined face of the top face plate.

4. The onboard camera according to claim 2, wherein the insertion portions are formed by bending the metal plate member into V shapes or U shapes.

5. The onboard camera according to claim 4, wherein a width of an open side of each of the insertion portions before assembly is greater than a width of each of the clearances.

6. The onboard camera according to claim 4, wherein a slit is formed in each of the insertion portions.

7. The onboard camera according to claim 1, wherein at least a portion of the bottom face plate with which the insertion portions come in contact is not painted.

8. The onboard camera according to claim 1, wherein the end portions at the left and right opposite ends of the bottom face plate are respectively formed by bending a metal plate member upward and the end portions at the left and right opposite ends of the top face plate are respectively formed by bending a metal plate member downward.

9. The onboard camera according to claim 1, wherein the insertion portions each include spaced apart slits in the first side and the second side to form comb shaped insertion portions.

* * * * *